(12) United States Patent
Bifulco

(10) Patent No.: US 12,402,636 B1
(45) Date of Patent: Sep. 2, 2025

(54) MEAT PROCESSING ASSEMBLY

(71) Applicant: Phil Bifulco, Parkland, FL (US)

(72) Inventor: Phil Bifulco, Parkland, FL (US)

( * ) Notice: Subject to any disclaimer, the term of this patent is extended or adjusted under 35 U.S.C. 154(b) by 101 days.

(21) Appl. No.: 17/949,038

(22) Filed: Sep. 20, 2022

(51) Int. Cl.
*A22C 17/10* (2006.01)
*A22C 17/00* (2006.01)

(52) U.S. Cl.
CPC ............ *A22C 17/002* (2013.01); *A22C 17/10* (2013.01)

(58) Field of Classification Search
CPC .... A22C 17/0006; A22C 17/002; A22C 17/10
USPC .................. 452/142, 148, 149, 155, 159
See application file for complete search history.

(56) References Cited

U.S. PATENT DOCUMENTS

| | | | | |
|---|---|---|---|---|
| 1,849,407 A * | 3/1932 | McKee | ................ | A22C 17/10 |
| | | | | 101/26 |
| 1,941,118 A | 12/1933 | Thompson et al. | | |
| 1,942,500 A | 1/1934 | Spang | | |
| 2,040,148 A * | 5/1936 | McKee | ................ | A22C 17/10 |
| | | | | 101/32 |
| 2,051,207 A | 8/1936 | Ferry | | |
| 2,118,119 A | 5/1938 | Spang | | |
| 2,149,407 A | 3/1939 | Spang | | |
| 2,380,371 A | 7/1945 | Spang | | |
| 2,492,997 A | 1/1950 | Herceg | | |
| 2,653,430 A | 9/1953 | Vogt | | |
| 2,718,028 A * | 9/1955 | Read | ................ | A22C 9/008 |
| | | | | 452/142 |
| 2,984,138 A | 5/1961 | Vitense et al. | | |
| 3,222,712 A | 12/1965 | Deckert | | |
| 3,222,713 A | 12/1965 | Stein et al. | | |
| 3,273,300 A | 9/1966 | Watrous et al. | | |
| 3,556,185 A | 1/1971 | Lykkeberg | | |
| 3,716,893 A | 2/1973 | Vogelsang | | |
| 3,786,536 A | 1/1974 | Deckert | | |
| 3,962,751 A * | 6/1976 | Wagner | ................ | A22C 9/004 |
| | | | | 452/142 |
| 4,034,668 A * | 7/1977 | Picknick | ................ | A22C 17/10 |
| | | | | 101/35 |
| 4,038,893 A | 8/1977 | Reist | | |
| 4,358,920 A | 11/1982 | Kanai et al. | | |
| 4,670,943 A * | 6/1987 | Townsend | ............ | A22B 5/166 |
| | | | | 99/589 |
| 4,993,211 A | 2/1991 | Piano | | |

(Continued)

*Primary Examiner* — David J Parsley
(74) *Attorney, Agent, or Firm* — MALLOY & MALLOY, P.L.

(57) ABSTRACT

An assembly for processing meat travelling along a path of travel and including a marking roller disposed transverse to the path of travel and including at least one but preferably a plurality of marking sections rotatable with the marking roller. Each of the marking sections includes at least one marking member rotatable therewith and extending outwardly therefrom into penetrating relation to meat passing along the path of travel. Penetration of each marking member into the meat produces a mark such as, but not limited to an alpha-numeric character corresponding in configuration to that of the penetrating marking member. A plurality of marking members may be mounted on one or more of the marking sections such that the meat will have a multi-character mark formed thereon as the marking members sequentially penetrate the meat during rotation of the marking roller and passage of the meat along the path of travel.

9 Claims, 25 Drawing Sheets

(56) References Cited

U.S. PATENT DOCUMENTS

| | | | |
|---|---|---|---|
| 5,222,422 A | 6/1993 | Benner, Jr. et al. | |
| 5,957,767 A * | 9/1999 | Horton | A22C 9/004 |
| | | | 452/142 |
| 6,722,494 B2 | 4/2004 | Nakakado | |
| 6,758,109 B2 | 7/2004 | Nakakado | |
| 7,036,413 B2 | 5/2006 | Hartmann et al. | |
| 7,587,966 B2 | 9/2009 | Nakakado et al. | |
| 7,682,227 B1 * | 3/2010 | Bifulco | A22C 17/0006 |
| | | | 452/141 |
| 7,975,584 B2 | 7/2011 | McCabe | |
| 8,307,762 B1 | 11/2012 | BiFulco | |
| 8,353,233 B1 | 1/2013 | Bifulco | |
| 8,776,653 B1 | 7/2014 | Bifulco | |
| 2002/0125105 A1 | 9/2002 | Nakakado | |
| 2005/0034581 A1 | 2/2005 | Bortone et al. | |
| 2009/0114071 A1 | 5/2009 | Mardian | |
| 2010/0192739 A1 | 8/2010 | Piantoni et al. | |
| 2011/0009041 A1 * | 1/2011 | Spisich | A22C 9/008 |
| | | | 452/141 |
| 2013/0034640 A1 * | 2/2013 | Medley | A22C 17/10 |
| | | | 99/483 |

\* cited by examiner

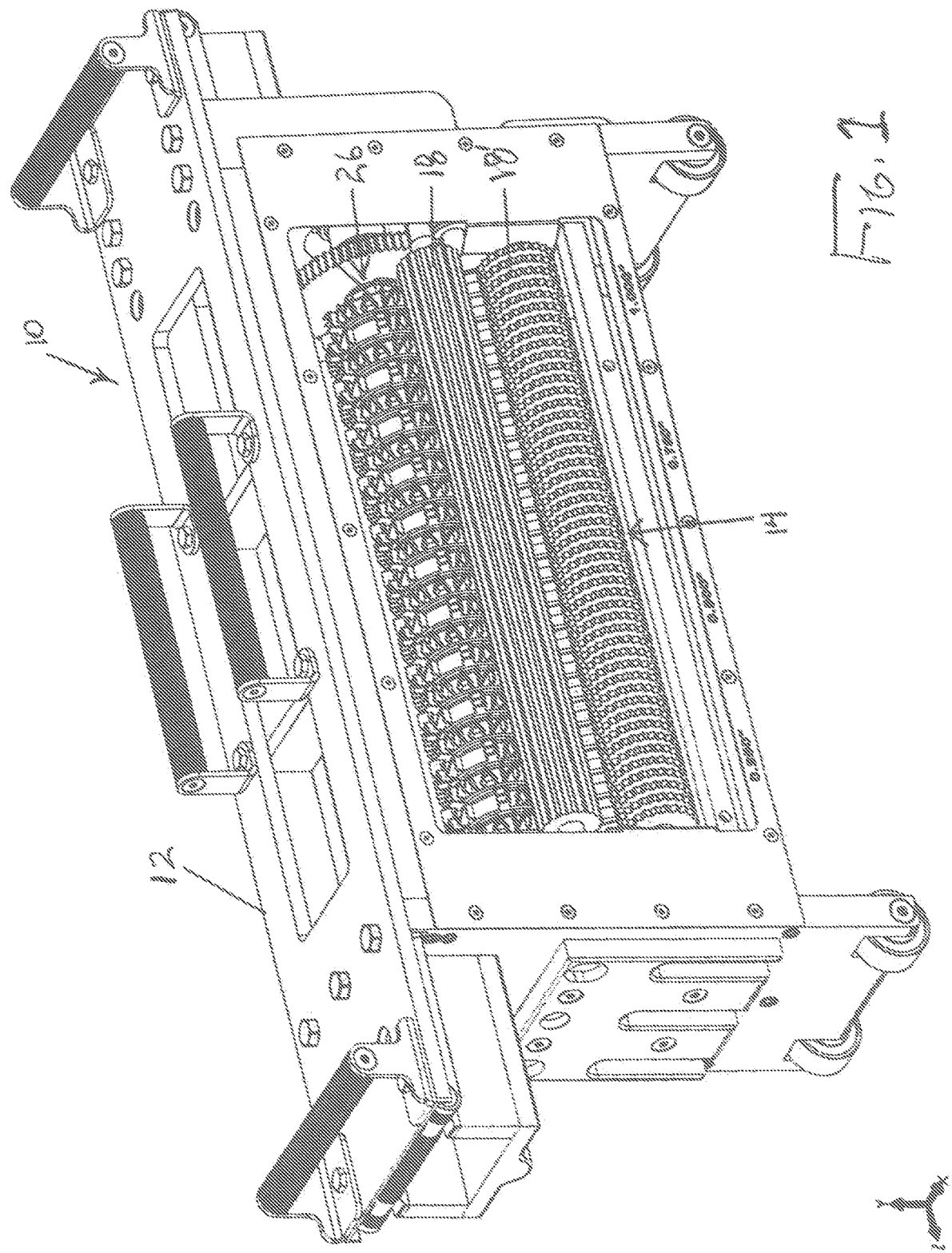

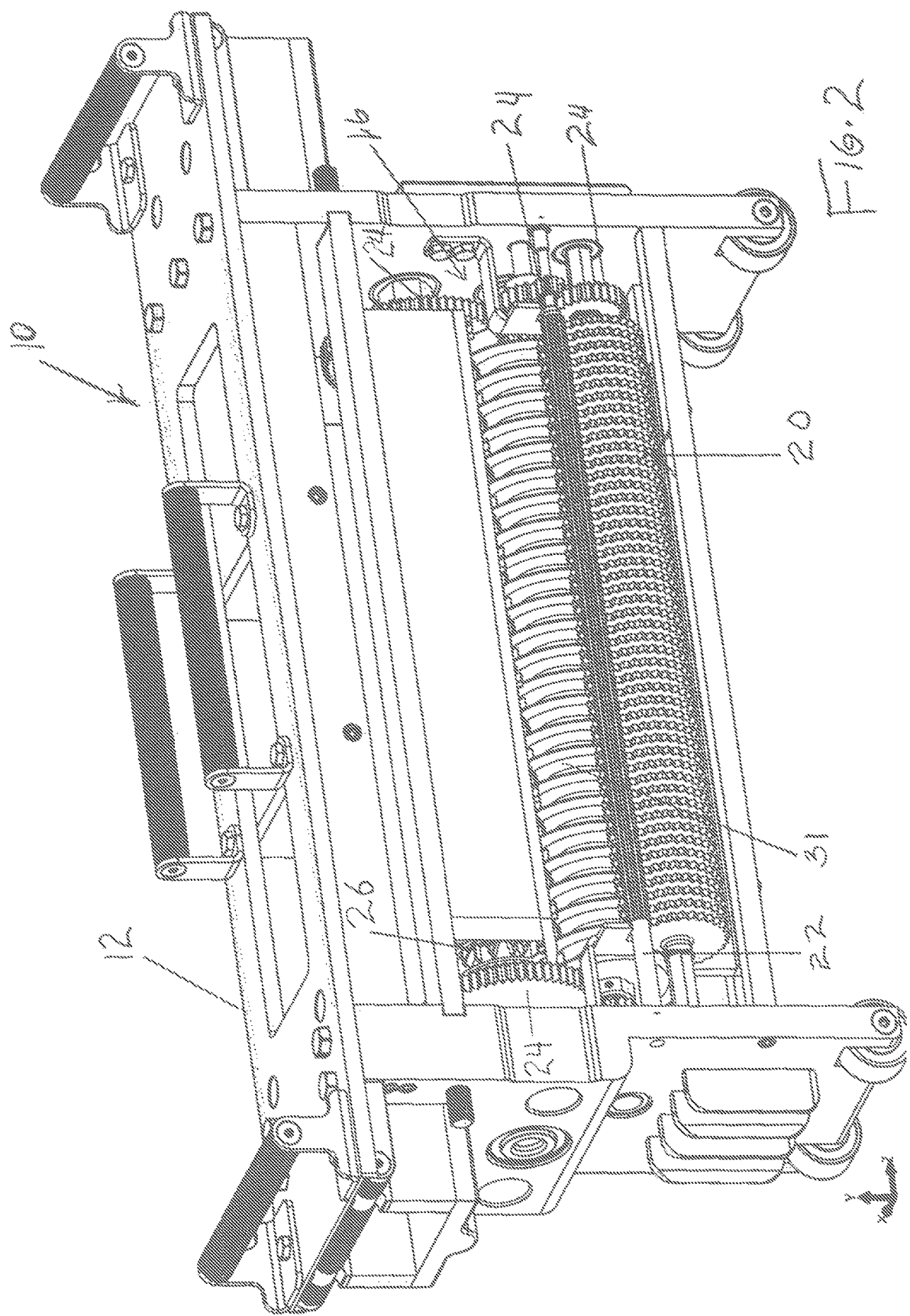

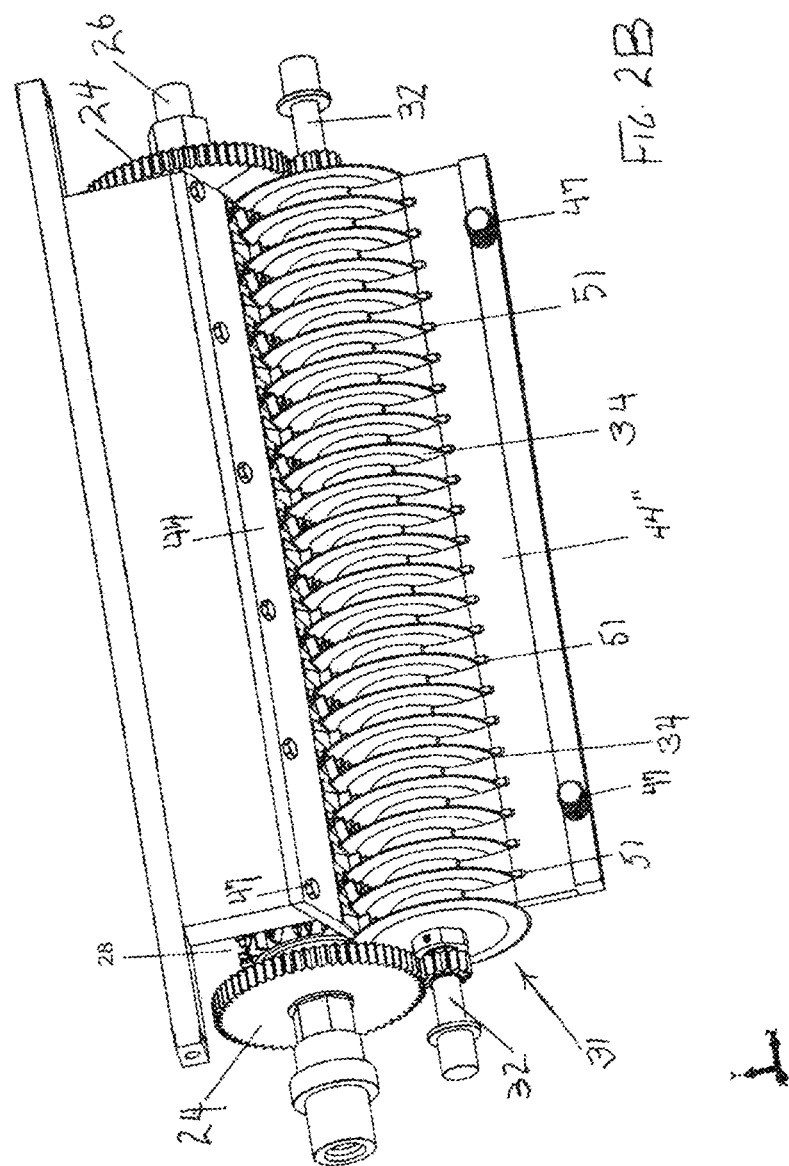

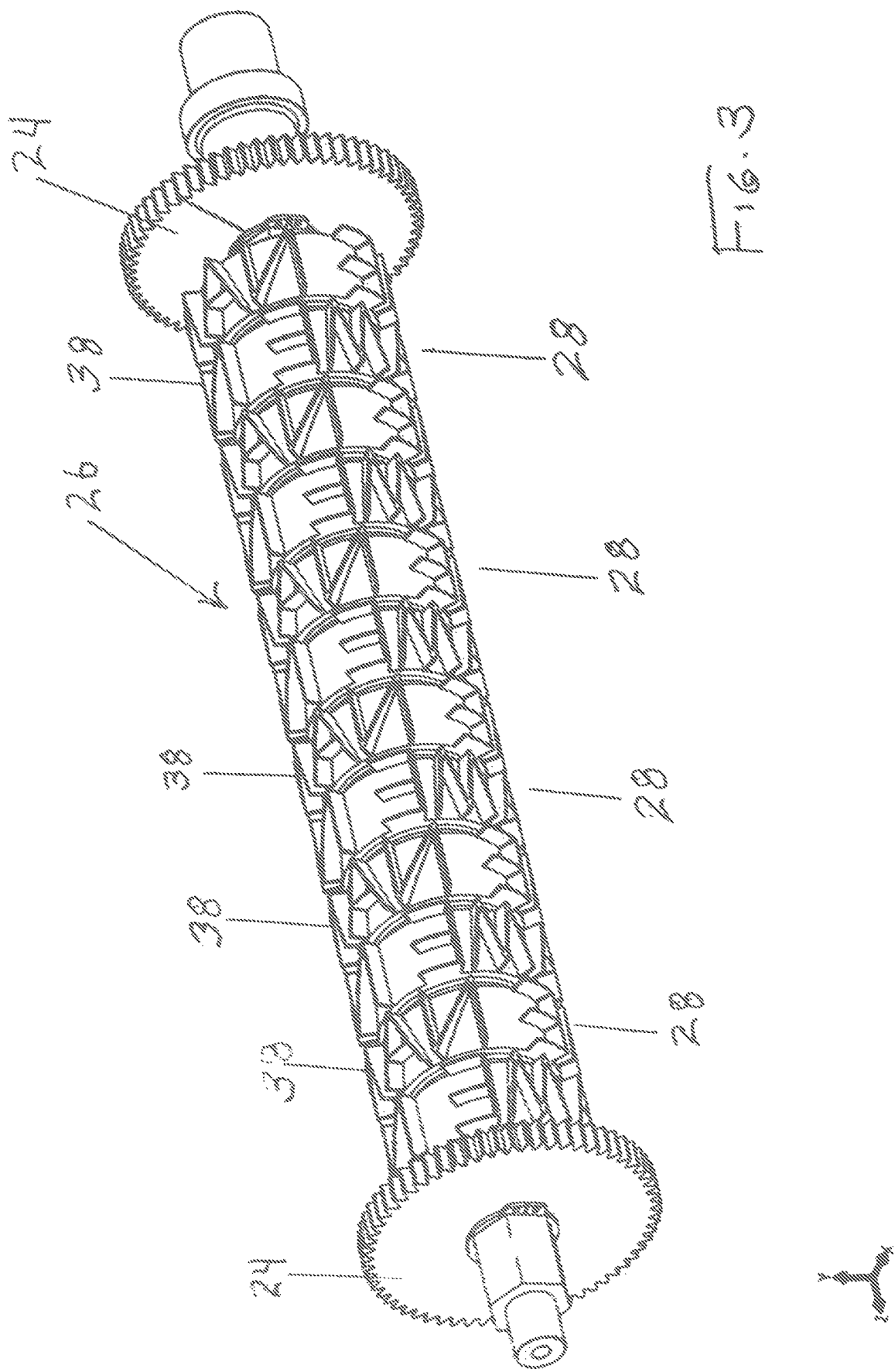

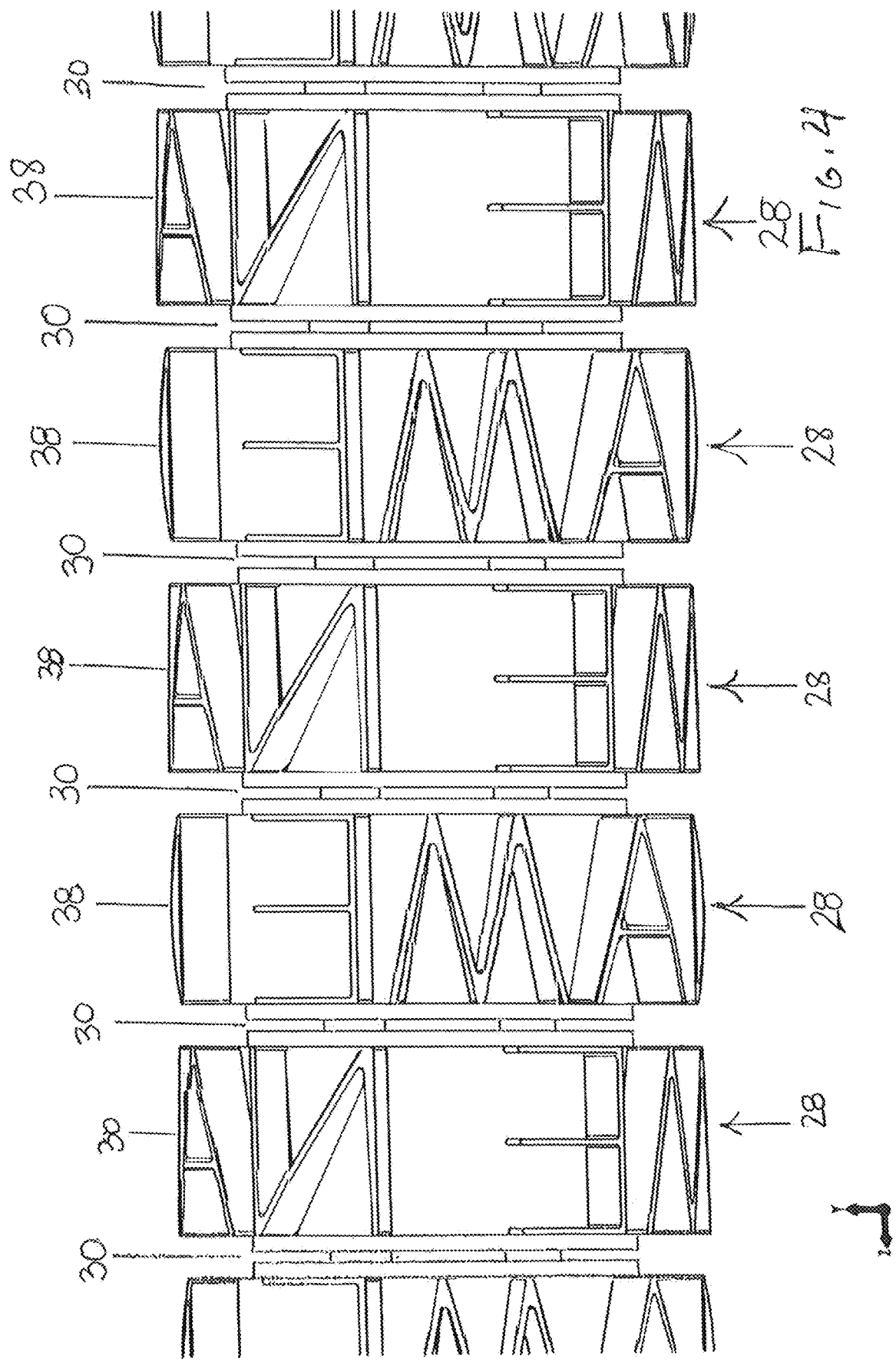

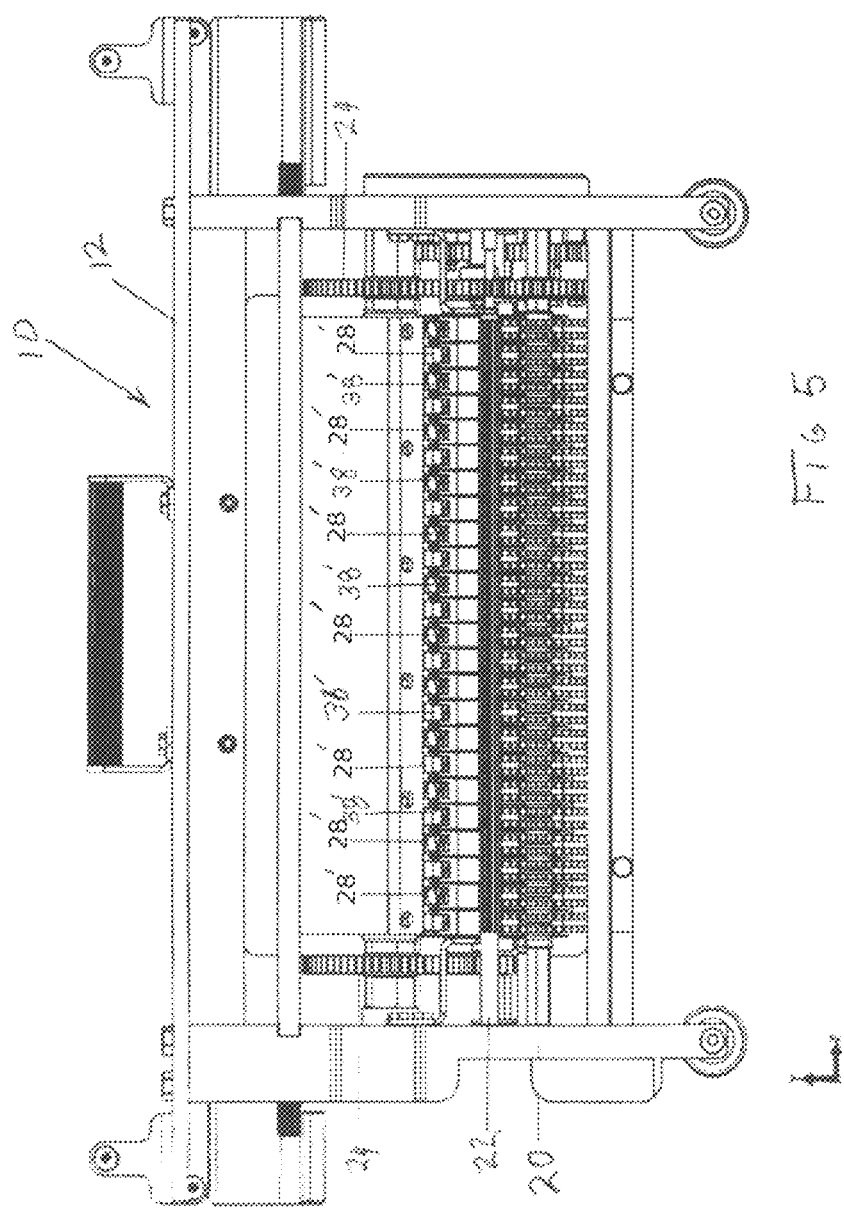

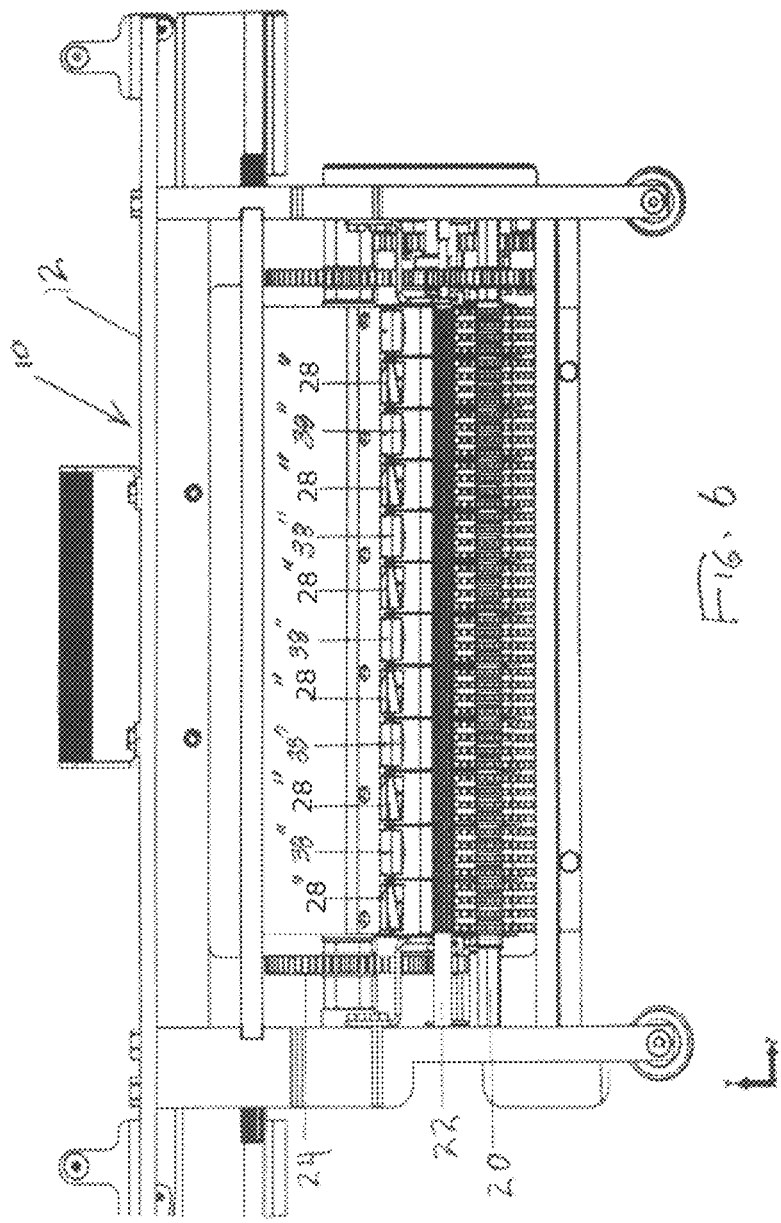

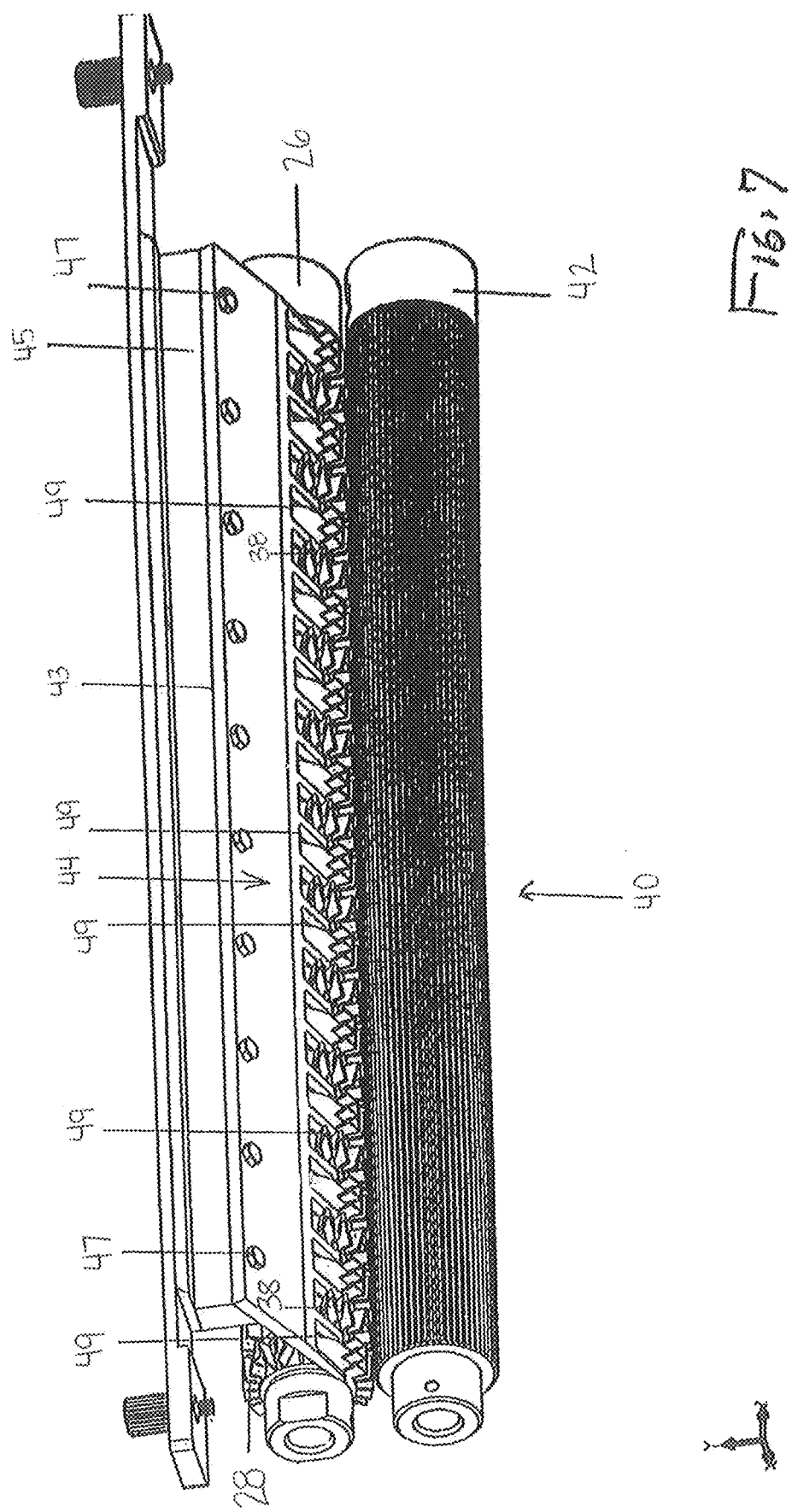

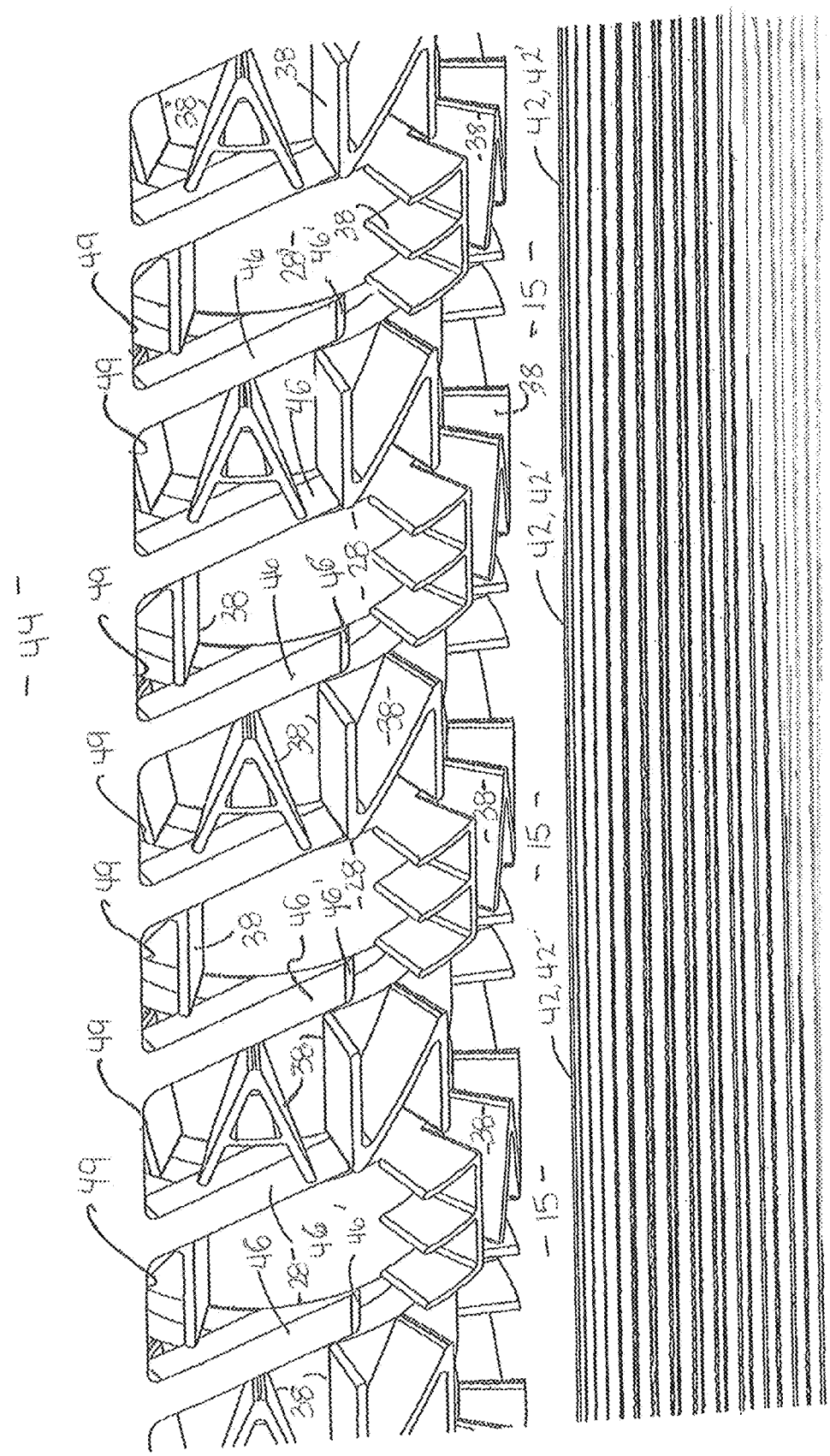

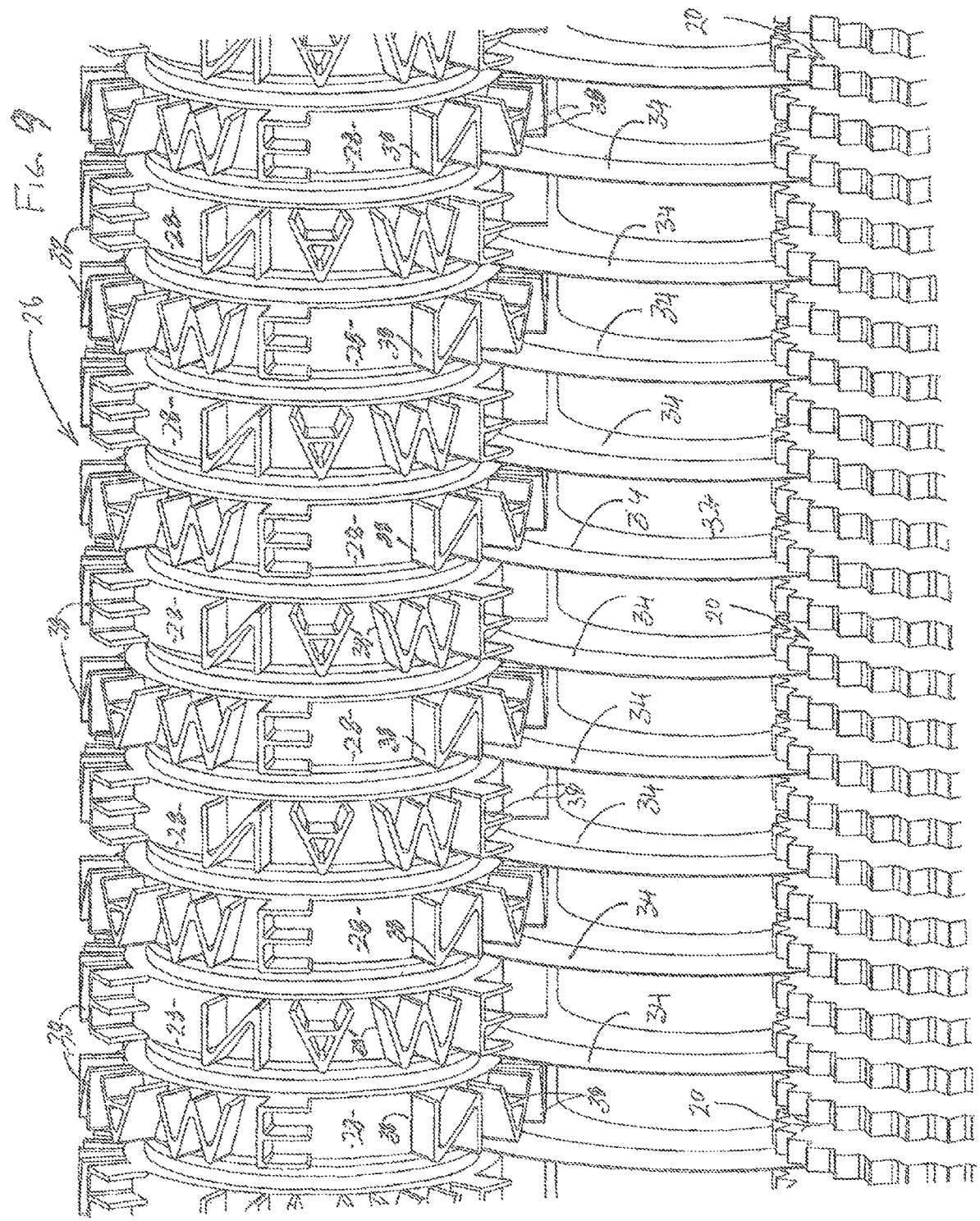

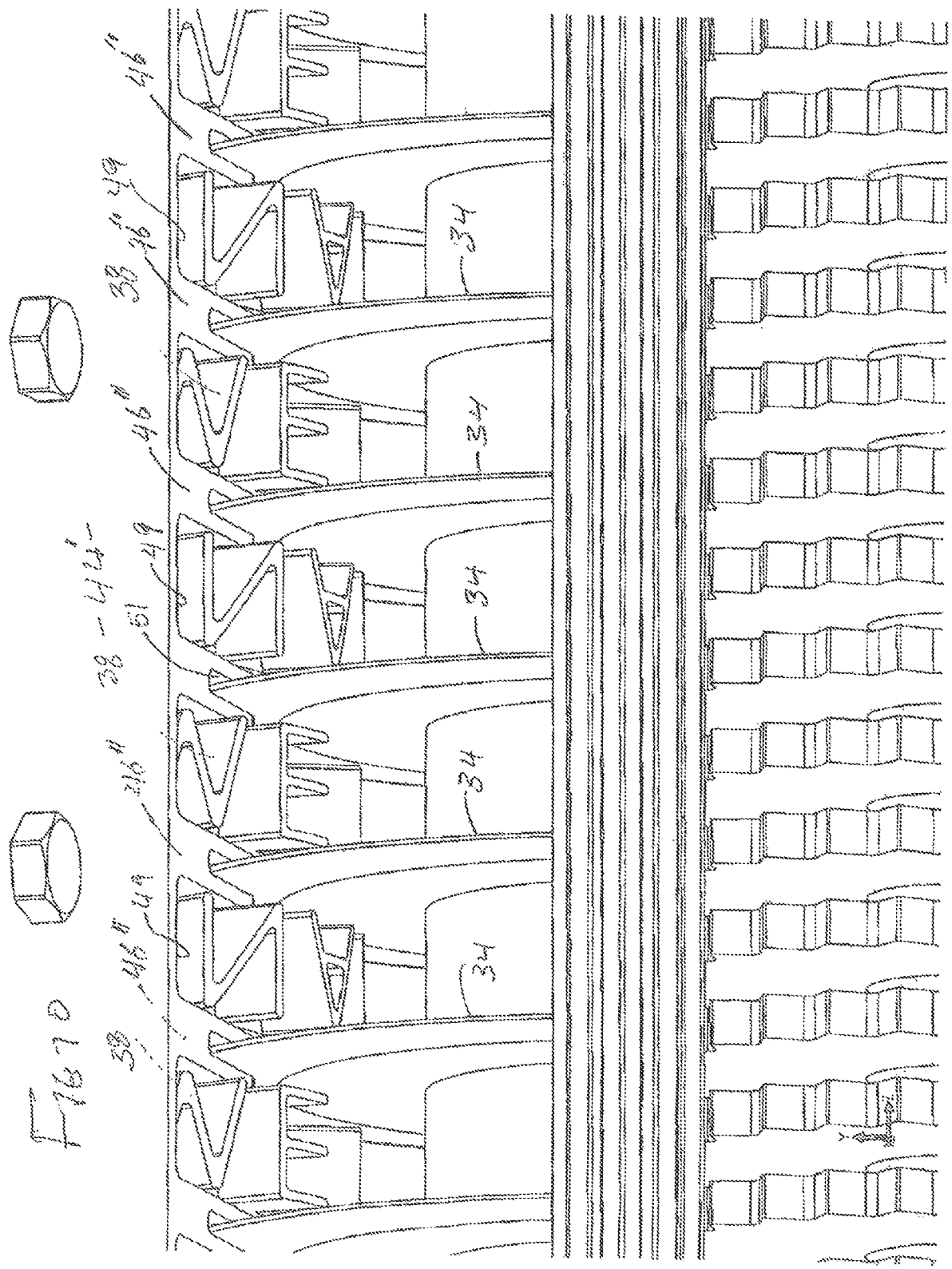

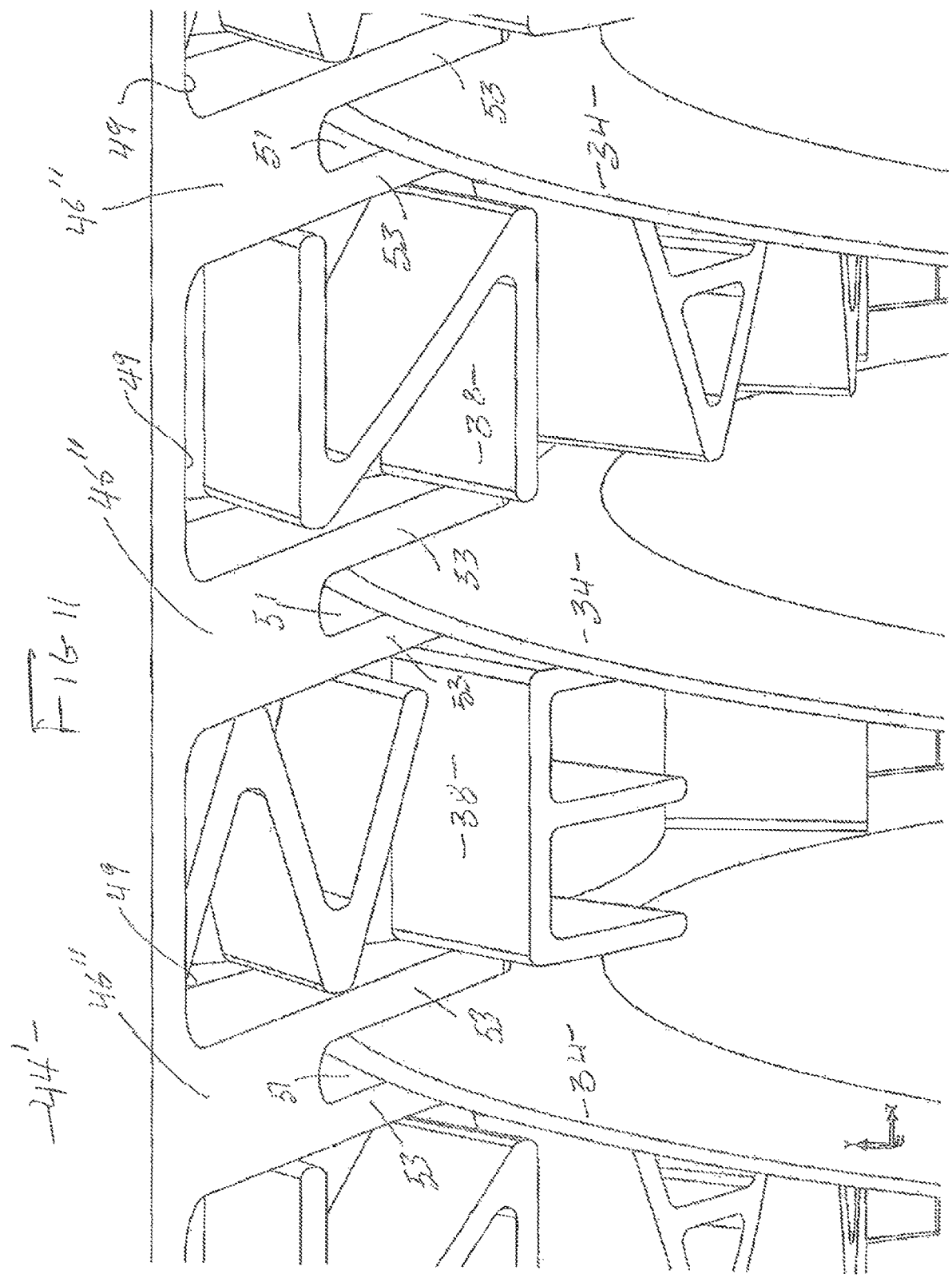

FIG. 12

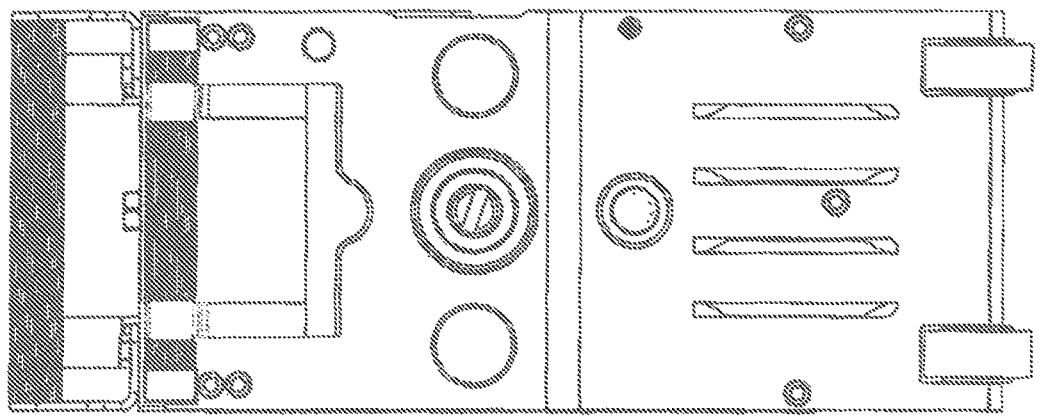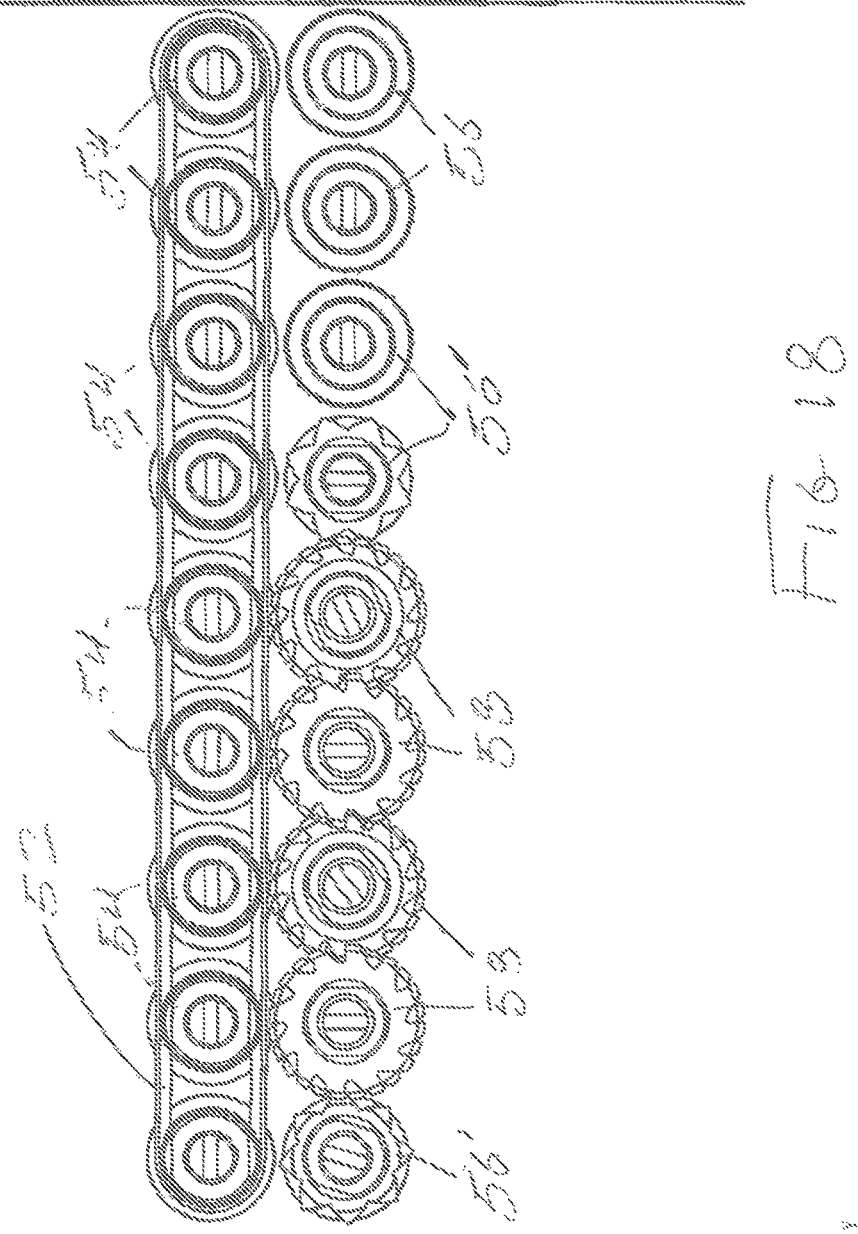
FIG. 18

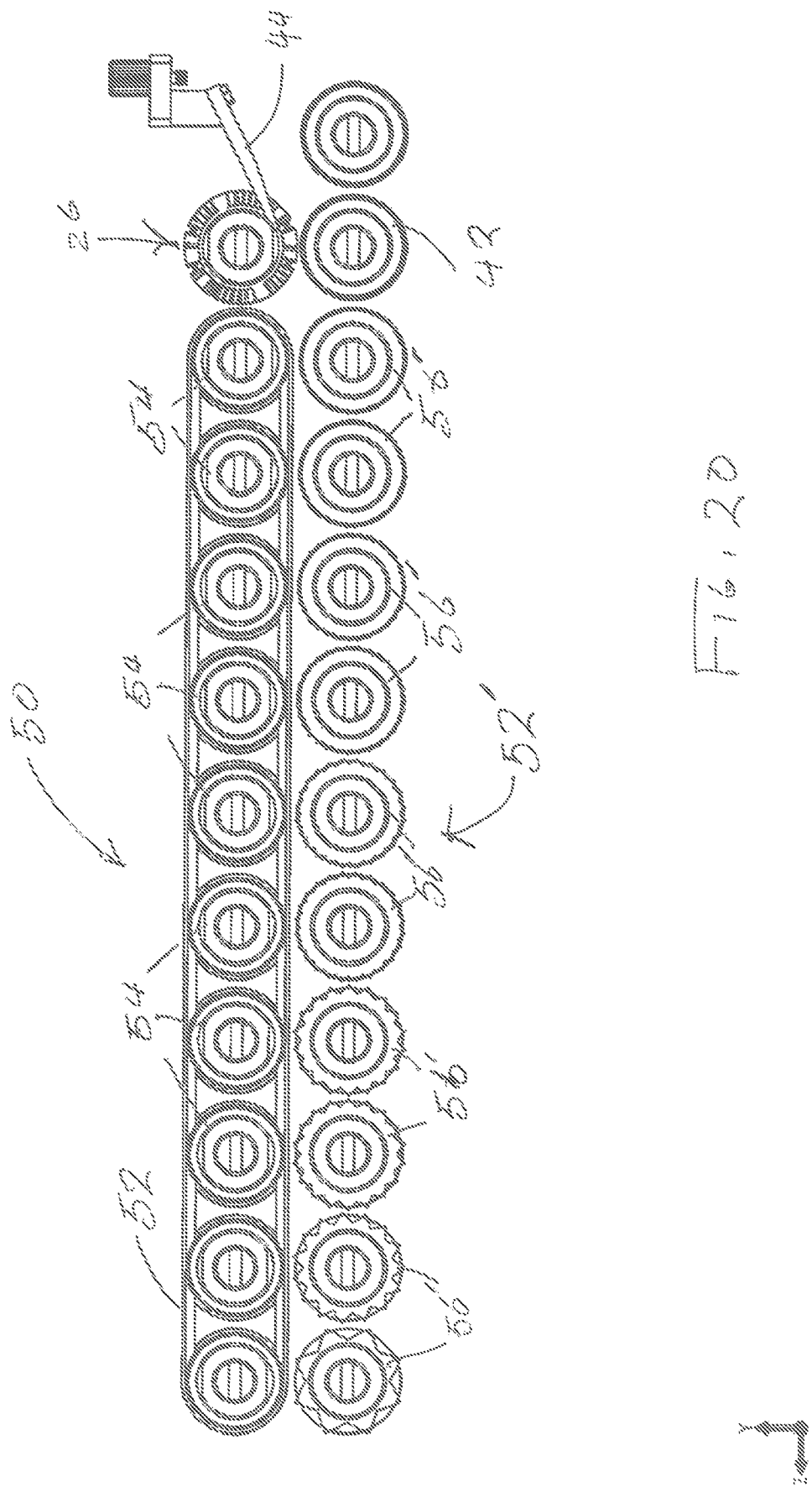

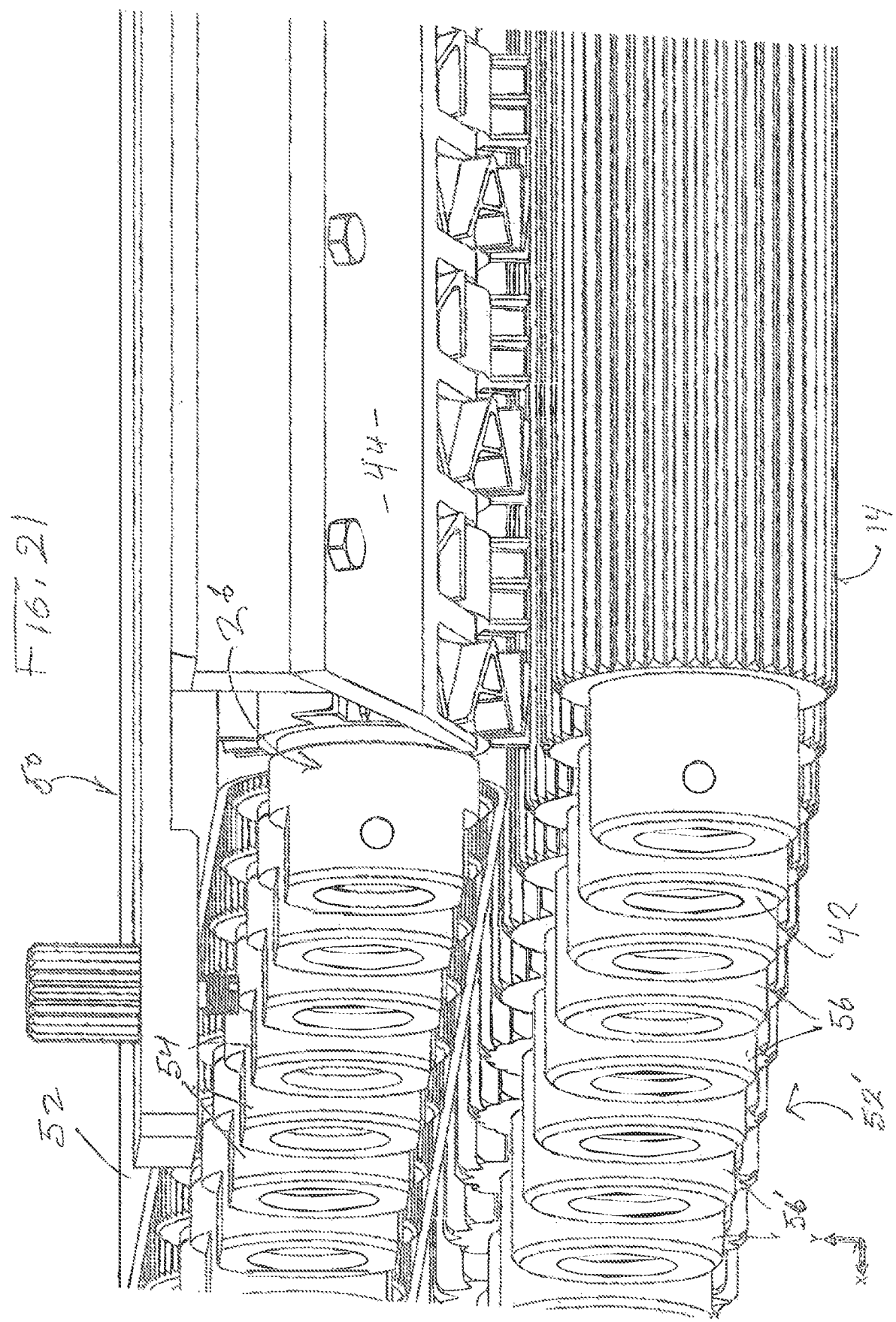

MEAT PROCESSING ASSEMBLY

BACKGROUND OF THE INVENTION

Field of the Invention

This invention is directed to a modular assembly for processing meat moving along a path of travel and includes a marking roller having one or more marking sections mounted thereon and rotatable therewith. Each marking section includes at least one marking member extending outwardly from the marking roller in penetrating relation to meat passing along the path of travel. Each of the one or more marking members is disposed and structured to produce a correspondingly configured mark on the meat when in penetrating relation to the meat, as the marking roller, marking section(s) and making member(s) rotate. A support assembly is disposed along the path of travel in supporting relation to the meat substantially concurrently to it being penetrated and marked by the one or more marking members.

DESCRIPTION OF THE RELATED ART

For many years, the food industry has relied on manual cutting for the cutting and other processing of meat products, wherein a larger piece of meat was reduced to smaller pieces of various sizes and configurations, dependent at least in part on the intended use of such reduced meat portions. However, it is well recognized that the manual cutting and processing of meat products is time consuming, labor intensive and lacks consistency in the size, shape, etc. of the final product.

Such inconsistencies are particularly common to smaller pieces or chunks of meat products when cut from a larger meat portion, wherein the smaller, typically strips or cube-like pieces are intended for different uses. Despite the recognized skill, and experience many butchers and like processing personnel demonstrate, there is still an overall lack of consistency in terms of size, weight, and other desirable characteristics of the smaller meat piece products. In addition to the disadvantages and problems as generally set forth above, processing personnel and butchers utilizing manual cutting techniques necessarily handle the food product extensively. These procedures frequently result in inherent sanitation problems and at least some dangers to the processing personnel.

In order to overcome problems of the type set forth above, attempts have been made to create automated cutting and/or meat/food processing systems which are structured to perform cutting and a variety of other processing features. While at least some of these automatic machines and/or systems are considered to be at least minimally operative for their intended purpose, consistency problems still exist in terms of the size, weight, shape, cut characteristics, etc. of the final product. Included in the aforementioned problems associated with known automated machines is the general inability to cut through heavy gristle and/or like muscle membrane. This inability frequently results in the processed pieces or portions still remaining attached by virtue of the failure to cut completely through existing gristle. Accordingly, many of the disadvantages associated with manual processing have been alleviated by such known automated processing equipment. However, problems still remain relating to the efficiency and reliability at which conventional automatic equipment performs as well as the consistency of the final product.

Therefore, there is a long recognized need in the food processing industry and more specifically in the area of meat cutting and processing for an efficient and effective automated processing assembly. Such an improved cutting assembly should be capable of accurately cutting meat into the desired shapes and sizes on a consistent basis while eliminating the above noted disadvantages associated with manual labor. Further, an improved and proposed cutting assembly should be structured to reliably and efficiently cut through heavy gristle, muscle membrane, etc., thereby eliminating any inconsistency problems and/or disadvantages commonly associated with known or conventional automatic cutting assemblies. Further, such an improved and proposed meat cutting assembly should be capable of timely processing large quantities of meat and other appropriate food products such as by passing the product along a defined path of travel. The versatility of such an improved cutting assembly would allow it to be an operative component of a more extensive processing line, where other processing steps may be performed on the product.

In addition, a preferred and proposed meat cutting assembly could be automated while being constructed into a modular unit efficiently disposable into and out of an operative position along the aforementioned path of travel, as a part of a processing line which includes other operative assemblies or components. At least one modular meat cutting assembly could include various self-contained operative features including a stabilizing assembly interconnected to various operative components of the modular cutting assembly so as to maintain accurate cutting of the food product being processed. In addition, such a modular cutting assembly operatively present along an intended processing line could be capable of accomplishing a preferred multipoint cutting procedure in order to facilitate an accurate and consistent cut of the meat product being processed.

In addition, a proposed meat or food processing assembly should have a modular construction so as to be included along a processing line and be structured to perform a marking or "naming" of the product pieces being processed. Moreover, such a marking or naming apparatus should be cooperatively structured to operate with a cutting blade and be readily adaptable to accommodate the cutting of the meat into strips, cubes, etc. of predetermined sizes, while maintaining the integrity of the mark or "name" formed on the meat pieces.

Finally, a proposed and improved meat cutting assembly should include an overall design and structure which enables a continued functioning of the cutting assembly even under relatively harsh operating conditions.

SUMMARY OF THE INVENTION

The present invention is directed to a preferably modular assembly for processing meat moving along a path of travel. As set forth in greater detail hereinafter the various operative components collectively define a portion of the path of travel which, due to the preferably modular construction of the assembly may be part of a meat or food processing line. An in-feed assembly and an out-feed assembly extend transversely to the path of travel substantially at opposite ends of a segment of the path of travel corresponding to the meat processing assembly. The in-feed and out-feed assemblies are respectively structured to respectively deliver and remove meat to other operative components of the assembly located between the in-feed and out-feed assemblies, which are disposed in interactive relation to the meat as it passes between the in-feed and out-feed assemblies.

More specifically, one preferred embodiment of the present invention includes a marking roller rotatably disposed in transverse relation to the path of travel between the in-feed and out-feed assemblies. The marking roller includes at least one but preferably a plurality of spaced apart marking sections each transversely connected about a periphery of the marking roller and rotatable therewith relative to the path of travel. Each of the marking sections includes at least one marking member, wherein one or more additional preferred embodiments include each or at least some of the marking sections comprising a plurality of marking members formed thereon.

The one or more marking members associated with each marking section extends outwardly from the outer periphery of the corresponding marking section and the outer surface of the marking roller. As such, upon rotation of the marking roller and concurrent passage of the meat along the path of travel, each of the marking members will penetrate the meat as the marking members assume the penetrating orientation. Each of the one or more marking members are dimensioned and structured to produce a mark, symbol, icon, character, etc. on the meat, wherein the formed mark, etc. will correspond in configuration to the corresponding marking member which formed it.

When a plurality of marking members are mounted on and rotate with the same marking section, the marking members may be arranged in adjacent, contiguous and/or predetermined spaced relation to one another about the periphery of the marking section. As such, as the marking members rotate with a corresponding one of the marking sections, they are relatively disposed to sequentially penetrate the meat. This may result in the marking members on the same marking section collectively producing a multi-character mark on a single cut meat segment, as each of the marking members are successively rotated into the aforementioned penetrating orientation or penetrating relation. Moreover, the marks formed in the meat by the penetrating marking members may be, but are not limited to, alphanumeric characters and thereby may collectively represent a name, logo, etc.

Other structural and operative features associated with one or more preferred embodiments of the assembly of the present invention include a support assembly mounted in interactive relation to the path of travel and in substantially aligned relation to the marking roller relative to the path of travel. Further, the support assembly preferably includes at least one support roller concurrently rotational with the marking roller, marking sections and marking members associated therewith. The at least one support roller is disposed on an opposite side of the path of travel relative to the marking roller and in movably supporting relation to a portion of the meat as it passes between the marking roller and support roller. The aligned relation of the support roller relative to the marking roller is such that the meat is effectively supported and thereby stabilized as each of the marking members are rotated into the penetrating orientation or penetrating relation with the meat.

In addition, the placement and structuring of the at least one support roller relative to the marking roller and penetrating marking sections is established and maintained at least to the extent of assuring a predetermined, sufficient and/or minimum depth of penetration of the marking members into the meat. Moreover, such a predetermined depth of penetration will be sufficient to define and establish an intended and preferred degree of integrity, clarity, durability and distinctness of the mark(s) formed in the meat. It is also noted that the opposite positioning of the marking roller and the support roller, relative to the path of travel, requires a cooperative operation of the drive assembly associated therewith. It will thereby be assured that the marking roller and support roller are concurrently rotated in opposite directions relative to the path of travel and to one another, while adequate support of the meat is maintained during its penetration.

Due to the predetermined depth of penetration of each of the marking members into the meat, there may be a tendency of the meat to be retained on the marking members as the marking roller continues to rotate. Accordingly, at least one preferred embodiment of the present invention includes a stripper structure, preferably in the form of a stripper plate or like member, fixedly disposed relative to the path of travel and to the marking roller. The stripper structure is disposed in interactive relation to the marking roller and to the marking sections thereon so as to effectively remove any meat having a tendency to be retained on the marking roller during its rotation and subsequent to the penetration of the marking members into the meat for purposes of forming the aforementioned single character or multi-character mark thereon.

In more specific terms, the stripper plate or other appropriate structure includes a plurality of outwardly extending fingers formed on and protruding from the outer longitudinal peripheral edge of the stripper plate. Each finger passes between adjacently spaced ones of the plurality of marking sections on the marking roller. Also, in at least one embodiment the length and/or disposition of the fingers is such as to position the outer extremities thereof sufficiently closer to the path of travel so as to extend below or beneath a central axis of rotation of the marking roller. In such a position the stripper fingers are disposed to engage any portion of the meat having a tendency to be retained on the marking roller, subsequent to penetration thereof by the marking members, during the continued rotation of the marking roller. As a result, the meat will be stripped or removed from the marking roller and continue to pass along the path of travel from the stripper structure to and through the output assembly.

Structural compatibility between the stripper structure and the plurality of marking sections on the marking roller is at least partially accomplished by the inclusion of a slotted construction on the outer longitudinal peripheral edge of the stripper structure. Such a slotted construction comprises a plurality of spaced apart slots each dimensioned and disposed to receive a different marking section therethrough as the marking roller rotates. The aforementioned stripper fingers of the stripper structure are disposed between different, adjacent ones of the slots. In such a position, the stripper fingers are accurately disposed between adjacent marking sections and in movable engaging relation to any meat being retained on the marking roller.

Another feature of one or more preferred embodiments of the present invention includes the cooperative structure and operation between the aforementioned marking roller and a blade assembly in the form of a blade roller. More specifically, the blade roller extends transversely across the path of travel in direct communication and/or cutting relation to the meat passing there along. The cutting blade assembly further comprises a plurality of cutting blades transversely mounted on the blade roller in predetermined spaced relation to one another so as to rotate therewith. At least some of the plurality of the blades are cooperatively disposed and dimensioned to concurrently produce a plurality of cut meat segments, which at least initially may be in the form of meat strips. Further the spacing between each of the rotating blades includes a width or transverse dimension substantially corresponding to a width or transverse dimension of corresponding ones of the marking sections. Therefore, the marking members associated with each marking section will penetrate into the meat to impart the intended mark, character, name, logo, icon, etc. thereon as the marking members are rotated into the penetrating orientation or penetrating relation with the meat. As a result, each of a plurality of strips into which the meat is cut by the plurality of blades will be appropriately marked or named through the meat's interaction with the marking sections and corresponding marking members formed thereon.

Appropriate interaction and/or alignment of the plurality of blades sufficient to assure the cutting of the meat segments into a strip like configuration can be facilitated through the provision of a mate assembly in the form of at least one mate roller extending transverse to the path of travel and disposed in stabilizing engagement with the meat. Such a mate assembly is described in greater detail in U.S. Pat. No. 8,307,762, to the inventor herein.

As indicated herein, an enhanced versatility of the processing assembly of the present invention is attributable to the structuring thereof into a module assembly. As such, the aforementioned marking roller, support roller, in-feed assembly, out-feed assembly, stripper structure, etc. can be easily inserted as a unit into and out of an appropriate portion of a larger processing line. Therefore, other meat or food processing modules, equipment, apparatus, etc. May also be permanently of temporarily positioned either upstream or downstream of the marking assembly and its cooperative components, thereby providing additional processing features to meat passing along the processing line. When used in such a practical environment, the processing assembly of the present invention will define a path of travel of the meat being processed, which represents only a segment of what may be considered the processing line along which meat passes, while being exposed to other processing steps.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 1 is a front perspective view of a meat processing assembly of the present invention.

FIG. 2 is a rear perspective view of the embodiment of FIG. 1.

FIG. 2B is a rear perspective view of a portion of the meat processing assembly of the present invention including the embodiment of FIG. 2A.

FIG. 3 is a perspective view of a naming or marking roller comprising a plurality of marking sections formed thereon and rotatable therewith.

FIG. 4 is a detail view in partial cutaway of a portion of the naming or marking roller of the embodiment of FIG. 3.

FIG. 5 is a rear elevation view of the embodiment of FIGS. 1 and 2 wherein naming or marking roller of the embodiment of FIG. 4 includes a plurality of marking sections of a predetermined size.

FIG. 6 is a rear view of the embodiment of FIGS. 1 and 2, wherein the marking sections may vary in size and configuration from that represented in FIG. 5.

FIG. 7 is a detailed perspective view of the interactive positioning of the naming or marking roller of the embodiment of FIGS. 3 and 4 in combination with a stripper structure and further operatively positioned for interaction with a support assembly.

FIG. 8 is a perspective view in detail representing the interactive positioning of the plurality of marking sections, stripper structure and support roller as represented in FIG. 7.

FIG. 9 is a perspective detail view in partial cutaway representing a plurality of marking sections and marking members associated therewith in cooperative relation with a blade roller.

FIG. 10 is a perspective detail view of the embodiment of FIG. 9.

FIG. 11 is a perspective view in greater detail of interaction between the marking sections and members of the naming or marking roller and the plurality of blades of the blade roller as also represented in FIGS. 9 and 10.

Figure 12:
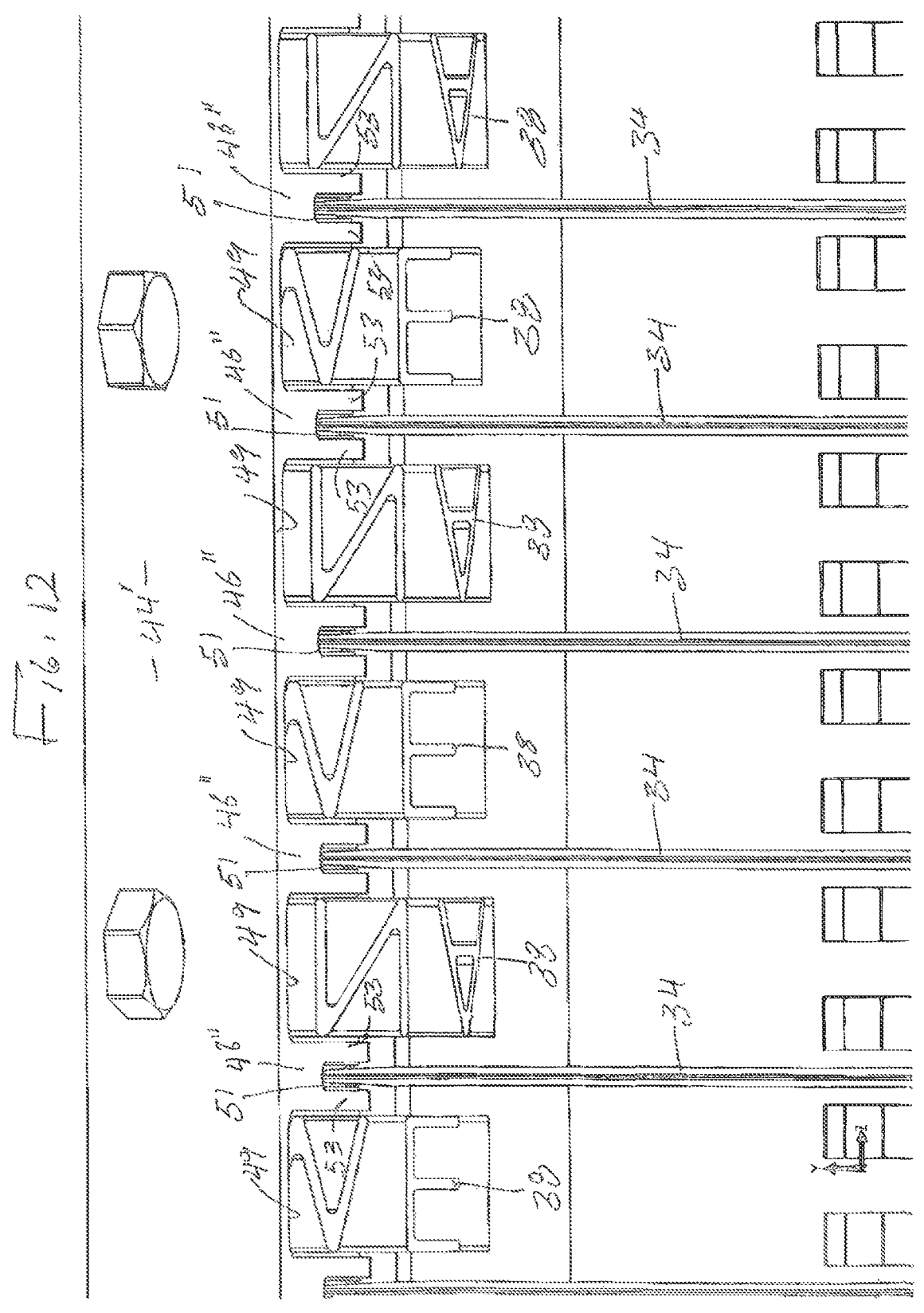

FIG. 12 is a front perspective view in detail of the embodiment of FIGS. 9-11.

FIG. 18 is a side view of another preferred embodiment of the shaping assembly operatively similar but structurally distinguishable from the embodiments of FIGS. 14-17.

FIG. 20 is a side view of another preferred embodiment of the shaping assembly operatively similar to but structurally distinguishable from the embodiments of FIGS. 14-19.

FIG. 21 is a front perspective view in partial cutaway of the shaping assembly, naming or marking roller and stripper structure associated with one or more preferred embodiments of the present invention.

Like reference numerals refer to like parts throughout the several views of the drawings.

DETAILED DESCRIPTION OF THE PREFERRED EMBODIMENT

As represented in the accompanying Figures, the present invention is directed to a meat processing assembly generally indicated as 10, wherein the various operative components, to be described in greater detail hereinafter, may be operatively connected to or within a modular frame, generally indicated as 12. However, the scope and intent of the present invention also contemplates utilization of the operative components of the meat processing assembly 10 to be structured for utilization outside of the modular frame "environment". However, as represented and/or the operative components of the modular supporting frame 12 is structured to be inserted, at an appropriate location within a "processing line" for a meat or other food product. As such, the processing assembly 10 defines at least a portion of a path of travel 15, schematically represented in at least FIGS. 14-19, of meat or food product passing along the processing line. The operative versatility and structural advantages of the modular, somewhat portable nature of the support frame 12 and the processing assembly 12 associated therewith are described in greater detail in U.S. U.S. Pat. Nos. 7,682,227; 8,307,762 and 8,353,233, to the inventor herein.

Figure 2A:
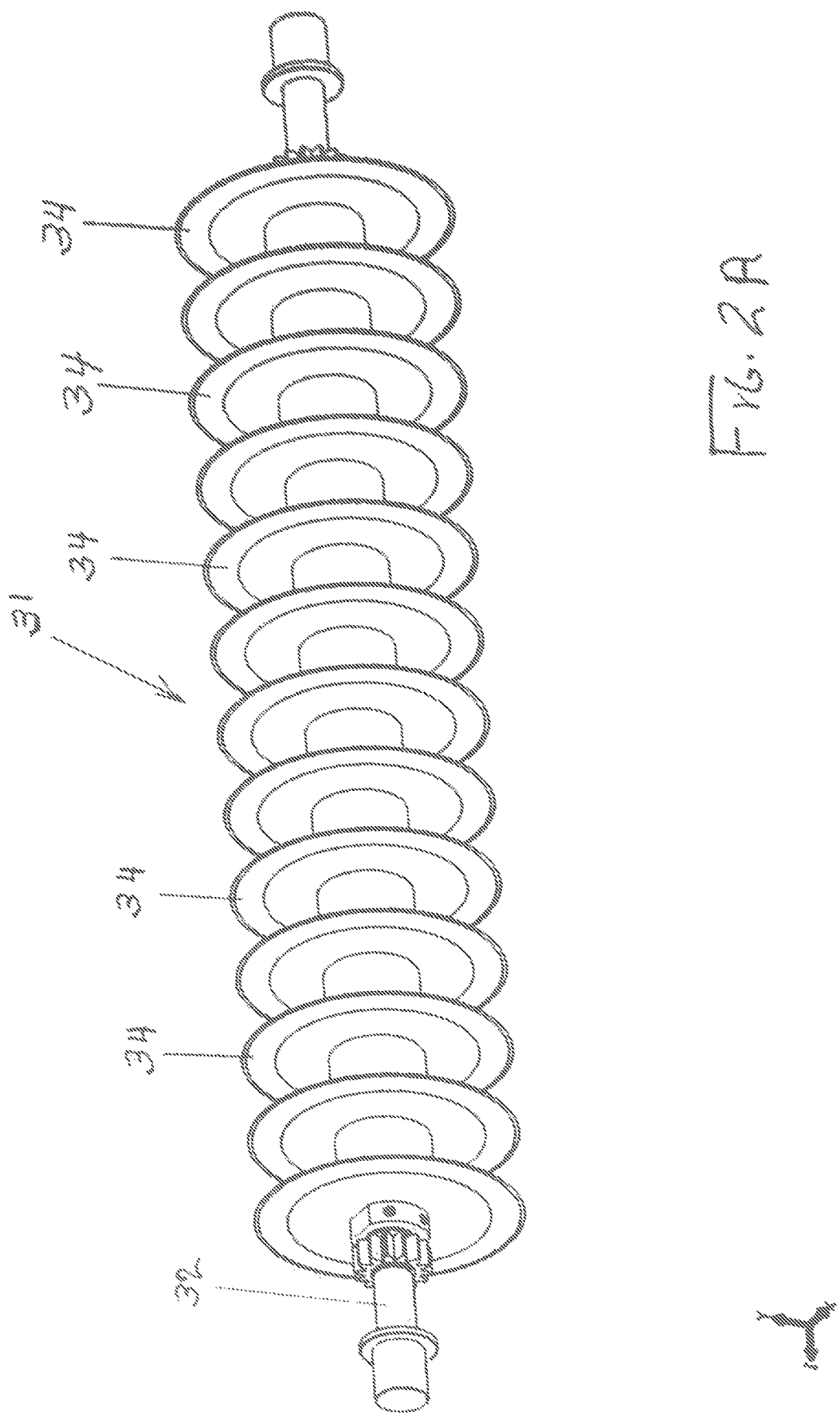
FIG. 2A is a perspective detail view of one embodiment of a blade assembly structure of the present invention.
Figure 2C:
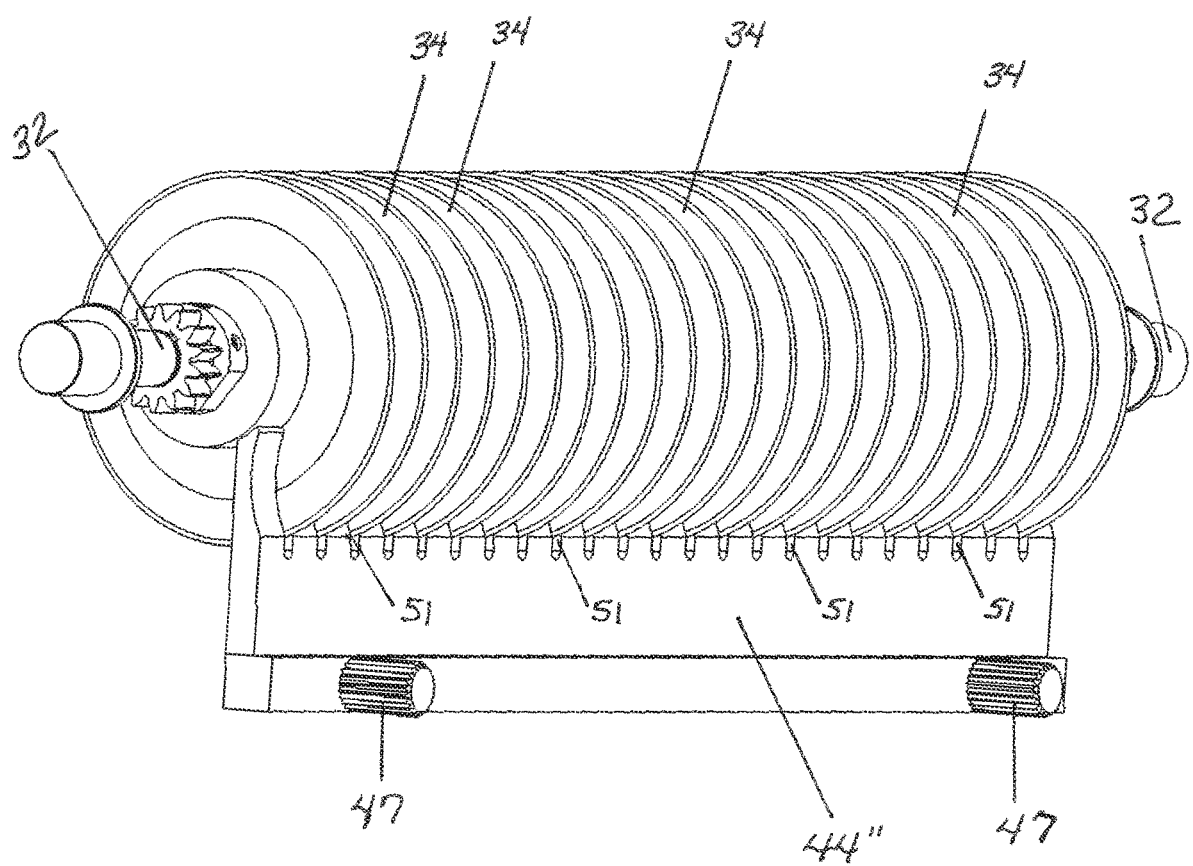
FIG. 2C is a perspective view in detail of some components of the embodiment of FIG. 2B.
Figure 2D:
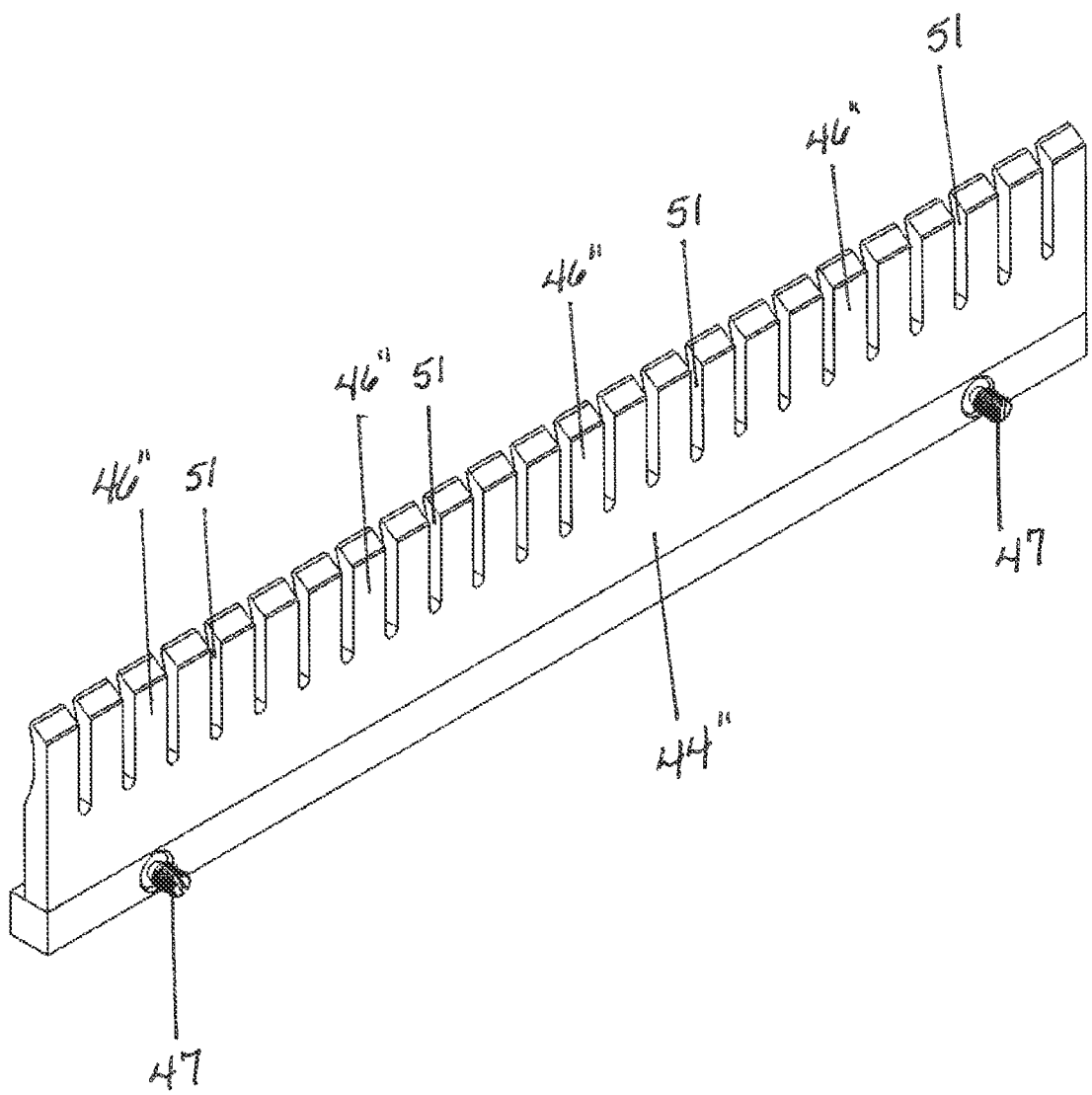
FIG. 2D is a perspective view in detail of some components of the embodiment of FIGS. 2B-2C.
Figure 13:
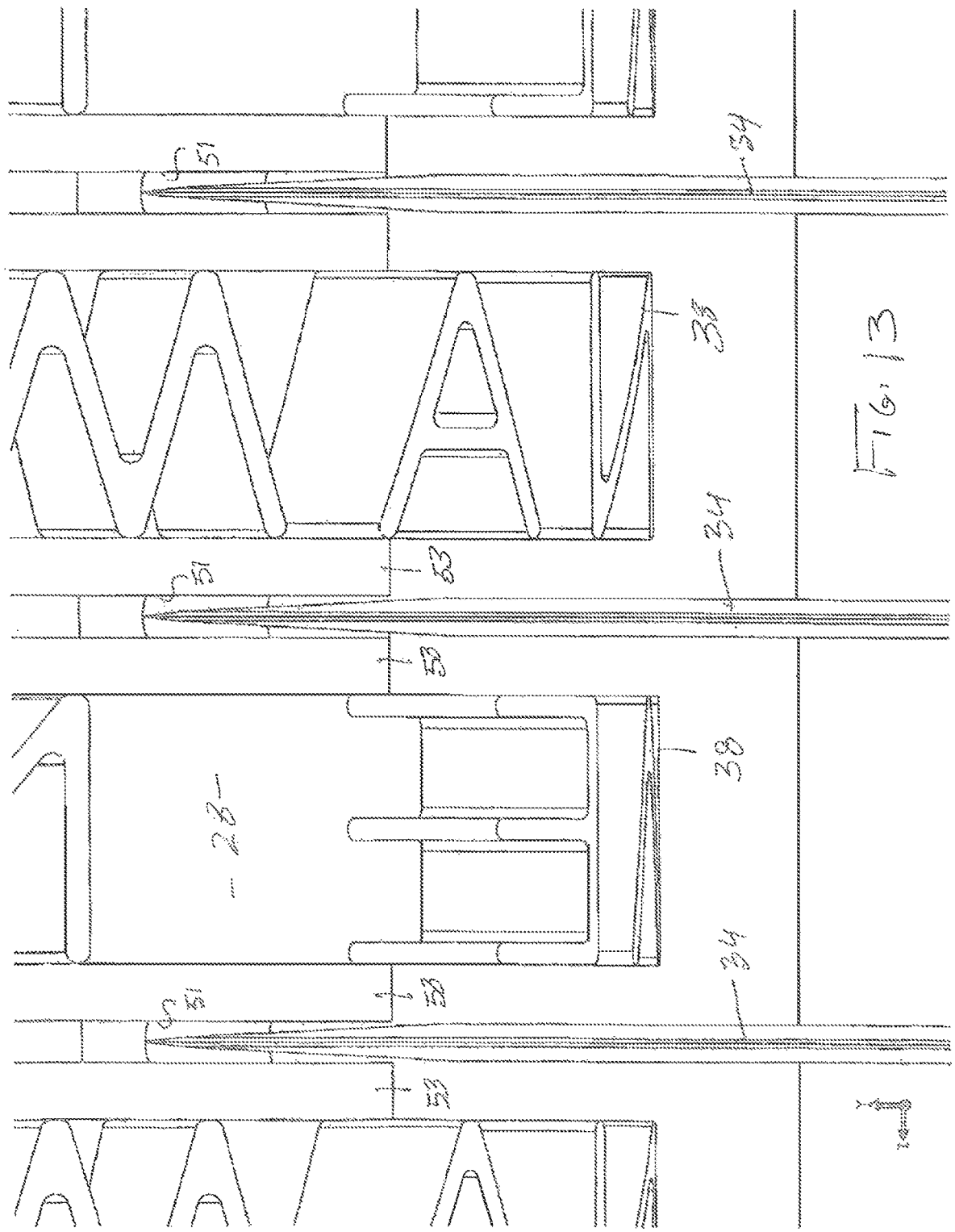
FIG. 13 is a front view in greater detail of the embodiment of FIGS. 11-12.

Therefore, the assembly 10, as operatively connected to and/or mounted on the modular support frame 12 or as otherwise applied without the modular support frame 12 may include an in-feed assembly 14 represented in FIG. 1 and an out-feed assembly 16 represented in FIG. 2. Each of the in-feed and out-feed assemblies 14 and 16 comprise a plurality of components which respectively facilitate the feeding or delivery of the meat or food product to the remaining operative components on the interior of the modular support frame 12, as well as the removal of the meat or food product, subsequent to the intended processing, from the assembly 10. In more specific terms, the in-feed assembly 14 includes in-feed rollers 18 and 18' between which the aforementioned path of travel 15 is defined and through which meat or food being processed passes for further processing into the modular frame 12. It is to be noted that the in-feed roller 18' may also be structured to serve as a mate roller, as described below. With primary reference to FIG. 2 the out-feed assembly 16 includes a mate assembly comprising a mate roller 20 comprising a plurality of mate sections as described in detail in U.S. Pat. No. 8,307,762, to the inventor herein. The out-feed assembly 16 may also include a guiding roller or like structure 22 further facilitating the removal or passage of the meat or food product from the assembly 10 and the support frame 12. As also represented in FIGS. 1 and 2 appropriately structured and disposed drive linkage comprising a plurality of gears 24 are operatively and/or drivingly connected to and disposed within the modular support frame 12. Location, size, and overall structuring of the linkage gears 24 is dependent, at least in part, on the overall operation of the various components with which they are associated.

With primary reference to FIGS. 1 through 4, each of the one or more preferred embodiments of the processing assembly 10 includes a naming or marking roller 26, wherein at least one embodiment of the marking roller 26 is represented in detail in FIGS. 3 and 4. The naming or marking roller 26 may be rotationally mounted or connected within the modular frame in transverse relation to the path of travel 15 and in interactive engagement with the meat or food product passing there along. Further, whether or not the processing assembly 10 of the present invention is used in the environment of a modular frame 12, the naming or marking roller 26 may be disposed to interact and perform its intended processing on the meat product along an intermediate segment of the path of travel 15 between the in-feed assembly 14 and the out-feed assembly 16.

The naming or marking roller 26 includes at least one, but preferably a plurality of marking sections 28 collectively and independently disposed in transverse, spaced relation to one another along the length of the marking roller 26. The marking sections 28 are fixed to the marking roller 26 and rotate therewith in a direction which is substantially aligned with the path of travel 15. Further, at least one preferred embodiment of the naming or marking roller 26 includes a plurality of spaces 30 disposed between adjacent ones of the marking sections 28. As such, the plurality of spaces 30 are dimensioned and disposed in predetermined, cooperative relation to a blade assembly 31 (see FIG. 4) comprising at least one blade roller 32 having a plurality of blades 34 transversely and collectively mounted along the length thereof in predetermined spaced relation to one another. Accordingly, the spacing between the blades 34 is predetermined to facilitate their passage through the spaces 30 (see FIG. 4) each disposed between different adjacent ones of the plurality of naming or marking sections 28, during concurrent rotation of the blade roller 32 and the naming or marking roller 26. As also should be apparent, the plurality of blades 34 are disposed in spaced relation to one another so as to facilitate passage of the correspondingly disposed plurality of naming or marking sections 28 to pass between adjacent ones of the blades 34. As represented, at least one embodiment of the processing assembly 10 comprises the naming or marking roller 26, including one or more marking sections 28 being disposed and structured for use without the blade roller 32 and/or plurality of blades.

As should be apparent, the blade roller 32 and the plurality of blades 34, rotating therewith, will engage the meat or food product passing along the path of travel 15. The dimension and configuration of the plurality of blades 34 serve to form a plurality of "cut meat segments or cut food segments", which may be in strip form. In more specific terms, the width of the cut meat sections or strips should be at least as great or equal to the width of the correspondingly disposed marking section 28. As should also be apparent, the width of the cut meat sections is substantially equal to the width between adjacent, corresponding blades 34 of the blade roller 32. Accordingly, and as set forth above, the width of the cut meat segments will be sufficient to at least equal the width of the correspondingly disposed marker section 28 and/or marker member or character 38 and therefore may be considered to substantially correspond to the width of the corresponding marker section 28.

Further, such cut meat segments will preferably or at least initially be in the form elongated strips each having a width which substantially corresponds to the width or transverse dimension of each of the corresponding marking sections 28, as set forth above. Disposition of the blade roller 32 relative to the naming or marking roller 26 can vary along the path of travel 15, such as between the in-feed assembly 14 and the out-feed assembly 16. More specifically, the cut meat segments can be formed prior to the meat interacting with the plurality of marking sections 28 or thereafter. Accordingly, the drive or mechanical linkage, comprising the plurality of gears 24, can be cooperatively arranged to accomplish the variable or at least preferred disposition of the blade roller 32 and plurality of rotary blades 34 relative to the naming or marking roller 26 and/or marking sections 28.

With primary reference to FIGS. 3, 4 and 7-9 each of the one or more marking sections 28 comprises at least one, but in certain practical applications, a plurality of marking members 38. Each of the one or more marking members 38 includes a predetermined configuration, which is intended to correspond to the mark (letter, numeral or other indicia character) formed on the meat by the corresponding marking member 38, as will be explained in greater detail hereinafter. In addition, each of the one or more marking members 38 is fixedly secured to a corresponding one of the marking sections 28 and rotates therewith upon the concurrent rotation of the marking roller 26. accordingly, each of the one or more marking sections 28 may have a circular, annular, or appropriate configuration, appropriate for rotation with the naming or marking roller and sequential engagement with the meat or food, as it substantially or at least partially surrounds the roller 26 on which it is mounted. As also represented, the one or more naming or marking members extend outwardly from the outer surface and/or periphery of a corresponding one of the naming or marking roller 26. Moreover, the position of the naming or marking roller 26, the marking sections 28 and in particular the marking members 38 are such as to interact with the meat passing along the path of travel 15 within the interior of the modular support frame 12. Therefore, the position and dimension of each of the marking members 38 is such as to penetrate the meat as it passes along the path of travel 15 concurrent to the rotation of the naming or marking roller 26, the naming or marking sections 28 and corresponding marking members 38.

The penetration of each of the marking members 38 will be to a sufficient depth to create or produce a correspondingly configured mark on the portion of the meat being penetrated. While the marking members 38 may be disposed, dimensioned and structured to penetrate the meat to different depths, it has been determined that a preferred depth of penetration is 0.375 inches, assuming that the thickness of the meat being penetrated is of sufficient thickness. Moreover, such a predetermined depth of penetration will be sufficient to define and establish an intended and preferred degree of integrity, clarity, durability and distinctness of the mark(s) formed in the meat. Further, the one or more marking sections 28 may include a plurality of marking members 38 disposed in adjacent and/or spaced relation to one another. As such, the rotation of the naming or marking roller 26, corresponding marking sections 28 and the respective marking members 38 will provide a successive penetration of the meat passing along the path of travel 15 when it is in aligned relation to the plurality of marking members 38.

When a plurality of marking members 38 are disposed on each of one or more of the marking sections 28, their successive penetration into the meat, concurrent to the rotation of the naming or marking roller 26, may serve to produce a "multi-character" mark on the meat being penetrated. The formation of the "multi-character" mark, such as a name, word, etc. is formed and recognizable as such, assuming the marking members 38 of a common marking section 28 are close enough to one another. As also demonstrated throughout the Figures, the various marking members 38 may have configurations, which substantially correspond to alpha-numeric characters. Therefore, as set forth above, successive penetration by a plurality of marking members 38 on the same marking section 28 may produce a "multi-character" mark which corresponds to an intended name, trademark, logo, etc. However, it is emphasized that the configuration of the various marking members 38 may vary and be other than an alpha-numeric character so as to represent different icons, designs or decorative indicia. In either situation, the mark, name, etc. formed on the meat product being processed and in particular the cut meat segments formed by interaction of the meat with the plurality of blades 34, will be visually observable at various stages of the storage, processing, handling, transporting etc. of the meat which has been processed by the assembly 10.

In more specific terms, forming of the mark or name on the meat by the penetration of the marking member(s) 38 to at least a predetermined minimum depth will facilitate the ability to clearly and easily, visually observe of the resulting mark in the various stages of meat production, handling, processing, etc. By way of example only, subsequent to forming the mark on the meat product, its storage and transportation in a frozen state is commonplace. However, it is preferable to restaurants, domestic consumers, etc. that the meat only be frozen a single time to maintain its integrity, taste, color, etc. Therefore, forming of the mark(s) on the meat by the penetration of the marking members 38 to at least a predetermined minimum depth will render the mark clearly visible, even after it is initially frozen. In addition, the resulting mark(s) will "cleanly" and/or accurately correspond to the configuration of the respective marking member from which it was formed. However, if the meat is thawed and subsequently re-frozen, the mark formed by the penetration of a respective marking member to the aforementioned predetermined minimum will result in a clearly discernible distortion and/or visually observable deterioration of the mark. Accordingly, the penetration of the meat by a marking member to at least the aforementioned predetermined depth will serve as a "refrozen indicator" thereby providing a clear indication that the meat has been frozen more than once. It is emphasized that the precise degree of penetration of a marking member needed to accomplish it reaching the "at least predetermined minimum depth" of penetration may vary on a number of factors. Such factors may include, but are not necessarily limited to, the type, texture, thickness and possibly other physical characteristics of the meat being marked as well as the physical dimensions and configuration of the marking member(s). Further, the ability of a marking member to penetrate the meat to the "at least predetermined minimum depth" will be at least partially dependent on the length of the marking member extending outwardly from the marking roller to which it is connected. Such an at least predetermined depth of the marking members 38 may be, but is not limited to, 0.375 inches as set forth above, dependent on the thickness of the meat being processed.

With primary reference to FIGS. 5 and 6, the versatility of the assembly 10 is further indicated by the ease and efficiency of replacing the plurality of marking sections 28 in order to vary the size, configuration, etc. of the marking members 38 thereon. Accordingly, FIG. 5 indicates a naming or marking roller including a plurality of marking sections 28' which have a predetermined width resulting in a corresponding predetermined width of the plurality of marking members 38'. By way of example only, the width or transverse dimension of the plurality of marking members 38' which serve to form the penetrated mark or name on the meat product being processed is generally, but not necessarily, about one-half inch. In contrast, the naming or marking roller 26" as represented in FIG. 6 includes a plurality of marking sections 28" having a greater transverse dimension, such as about three-fourth inch and/or 1 inch, which corresponds to an increased transverse dimension of width of the corresponding marking members 38", as should be apparent. The changing of the width of the marking sections 28' 28" and the width of the marking members 38, 38', 38", will require a change in the position of the plurality of blades 34 and more specifically the size of the space there between will be correspondingly adjusted. As a result, the aforementioned "cut meat segments" will have a width which substantially corresponds to the width or transverse dimension to the width of the marking sections 28' and 28" and/or the marking members 38, 38' and 38" respectively associated therewith. As should be apparent, the width of the cut meat segments will be substantially the same as the distance between adjacent ones of the blades 34 which forms the cut meat segments. Therefore, the width of the cut meat segments will be at least equal to the width of the correspondingly disposed marking section 28 disposed between the blades which form the cut meat segment.

With primary reference to at least FIGS. 7, yet another feature associated with the processing assembly 10 include the provision of a support assembly generally indicated as 40, comprising at least one support roller 42. The support assembly 40 and/or support roller 42 are respectively mounted in substantial longitudinal alignment with the naming or marking roller 26 and on an opposite side of the path of travel 15 extending there between. Further, the length of the support roller 42 is such as to be substantially the same as the marking roller 26 or at least equal to the collective length of the plurality of marking sections 28 disposed along the length of the marking roller 26. Therefore, the aligned orientation of the one support roller 42, on an opposite side of the path of travel 15, relative to the marking roller 26, will serve to support and stabilize the meat as it is being penetrated by each of the one or more rotating marking members 38 formed on corresponding ones of the marking sections 28.

Accordingly, the support roller 42 will rotate concurrently with the naming or marking roller 26, but in an opposite direction due to its disposition on the opposite side of the path of travel 15. The concurrent support of the meat as it is being penetrated by the rotating marking members 38, will allow a sufficient penetrating force to be applied to the meat by the penetrating marking members 38. In turn, a sufficiently deep penetration of the marking members 38 such as, but not limited to 0.375 inches as set forth above, can be accomplished. The result will be a clearly observable and stable mark being formed in the meat product being processed. To further facilitate the movement and concurrent support of the meat product during penetration by the marking members 38, the exterior surface as at 42' of the marking roller 42 may be ribbed or otherwise appropriately configured. The configuration of the surface 42' will facilitate at least a minimal gripping engagement with the meat passing along the path of travel 15 concurrent to it being penetrated by the marking members 38, without damaging the meat.

With further reference to FIGS. 7 and 8, yet another operative and structural feature of the assembly 10 includes the provision of a stripper assembly preferably comprising a stripper structure or plate 44 fixedly mounted on the modular support frame 12 in communicating, interactive relation with the marking roller 26 and more specifically with the one or more of the aforementioned marking sections 28' and 28". The stripper structure or plate 44 is fixedly secured to a mounting bar or like member 45 which may be fixedly and/or adjustably connected to the interior of the modular base 12 by any of a variety of appropriate bolts, knobs or other connectors 47. The mounting bar 45 and the stripper structure 44 are disposed in the aforementioned interactive relation to the naming or marking roller 26 and the one or more marking sections 28 rotatable therewith. Accordingly, the stripper structure 44 is transversely fixed along the path of travel 15 in adjacent, interactive relation to the marking roller 26. As such, the stripper structure is further disposed and structured to remove any meat and/or cut meat segments being retained on the naming or marking roller 26 as it continues to rotate and subsequent to the penetration of the marking members 38 into the meat or cut meat segments, as set forth above.

In addition, the outer or lower longitudinal peripheral edge or portion of the stripper structure 44, is disposed in direct interactive relation to the naming or marking roller 26 and marking sections 28. Further, a plurality of outwardly extending stripper fingers 46 having free ends 46' are disposed within the spaces 30 existing between adjacent ones of the marking sections 28. During the processing of the meat product and/or cut meat segments the penetrating relation of each of the one or more marking members 38 will result in a tendency of the meat to "stick to" and/or be retained on the penetrating marking members 38. This will result in the meat being retained on and moving/travelling with the marking roller 26 as it continues to rotate. Accordingly, as represented in FIG. 8, the positioning of the stripper fingers 46 and free ends 46', within the spaces 30 between each of the marking sections 28 will serve to remove the meat or cut meat segments from the marking roller 26 thereby overcoming the tendency of the meat to be retained on the penetrating marking members 38 and the marking roller 26. Further, the free ends 46' of each of the fingers 46 may have a somewhat beveled or other appropriate shape or configuration so as to minimize any damage to the meat or cut meat segments as the fingers 46 remove or dislodge the meat or cut meat segments from the marking sections 28' or 28" and/or marking members 38.

Also, in at least one embodiment the length and/or disposition of the stripper fingers 46 is such as to position the outer extremities 46' thereof sufficiently closer to the path of travel so as to extend below or beneath a central axis of rotation of the naming or marking roller 26. In such a position the stripper fingers 46 are disposed to efficiently engage any portion of the meat having a tendency to be retained on the marking roller 26, subsequent to penetration thereof by the marking members 38, during the continued rotation of the marking roller 26. As a result, the meat will be stripped or removed from the marking roller 26 and continue to pass along the path of travel 15 from the stripper structure 44 to and through the output assembly 16.

Appropriate positioning of the stripper fingers 46 in the manner disclosed in FIGS. 7 and 8, relative to the one or more marking sections 28 is facilitated by the aforementioned outer peripheral, longitudinal end of the stripper structure 44 having a "slotted construction". The slotted construction of the longitudinal, peripheral end comprises a plurality of slots 49 disposed in between adjacent ones of the plurality of stripper fingers 46. Each of the plurality of slots 49 are disposed and dimensioned, due at least in part to the angular orientation of the stripper structure 44 relative to the path of travel 15, to allow rotating passage of the marking sections 28 therethrough. Therefore, the width of the slots 49 is at least minimally greater than that of the correspondingly disposed marking sections 28 and/or respective marking members 38. During the rotation of the marking roller 26 in the intended manner, each of the one or more marking sections 28 will pass at least partially through correspondingly disposed ones of the open-ended slots 49. As such, the stripper fingers 46 will be appropriately positioned at least partially within the spaces in a manner which facilitates the stripper or removal of any meat being retained on the marking roller 26 during its rotation, subsequent to the penetration thereof by the marking members 38.

With further regard to the embodiment of FIGS. 7 and 8 and as represented in greater detail in FIGS. 2A-2D, one embodiment of the stripper assembly includes an auxiliary or secondary stripper plate 44" each including a plurality of channels 51 disposed in a line, receiving relation to the plurality of blades 34 mounted on a rotational with the blade roller 32. As set forth in detail hereinafter, one feature of the present invention is to remove, "flip" and clean any meat or other food product from the plurality of cutting blades 34. This is due to the fact that the meat or food product may have a tendency to be retained on anyone and/or between the cutting blades 34 as a result, the stripper plate 44" includes the plurality of channels 51 through which the blades 34 pass thereby assuring a removal of any meat or food product which may clean to the blade roller 32. The plurality of fingers 46" will thereby serve to remove any remaining meat or food product from the plurality of blades 34 and allow the processed meat or food to pass along the intended path of travel.

As set forth above and clearly represented in at least FIGS. 9 through 13, the naming or marking roller 26, marking sections 28 and one or more marking members 38 may interact and be used with a blade assembly 31. The blade assembly 31 comprises at least one blade roller 32 and a plurality of blades 34 connected thereto and rotatable with the blade roller 32. Accordingly, and as set forth herein with regard to the embodiment of FIGS. 2A-2D and FIGS. 7-9, it is another operative feature of the present invention to remove, "flip" or clean any meat or other food product from one or more cutting blades 34, because the meat or food may have a tendency to be retained on any one of the cutting blades 34. Therefore, one additional preferred embodiment of the stripper structure 44' is structuring to accommodate a "cleaning" of each of the one or more blades 34 to the extent that any meat or other food product retained thereon and/or between the blades 34 will be removed. More specifically, each of the stripper fingers 46 may include a bifurcated construction comprising an elongated or other appropriately configured and dimension channel 51 disposed between two elongated legs 53 which are fixedly or integrally connected to a remainder of the stripper finger 46. Further, each of the elongated channels 51 are dimensioned and configured to facilitate the receipt and movable passage there through of a correspondingly disposed one of the plurality of blades 34. In cooperation therewith, the spaces 30 between adjacent ones of the naming or marking sections 28 are aligned with the channels 51. At the same time, the stripper structure 44' by virtue of including the bifurcated stripper fingers 46 as well as the aforementioned slots 49 will accommodate passage therethrough of the plurality of naming or marker sections 28 and marker members 38, upon a concurrent rotation of the naming or marker roller 26 and blade roller 32, in interactive engagement with one another as set forth in further detail herein.

Figure 14:
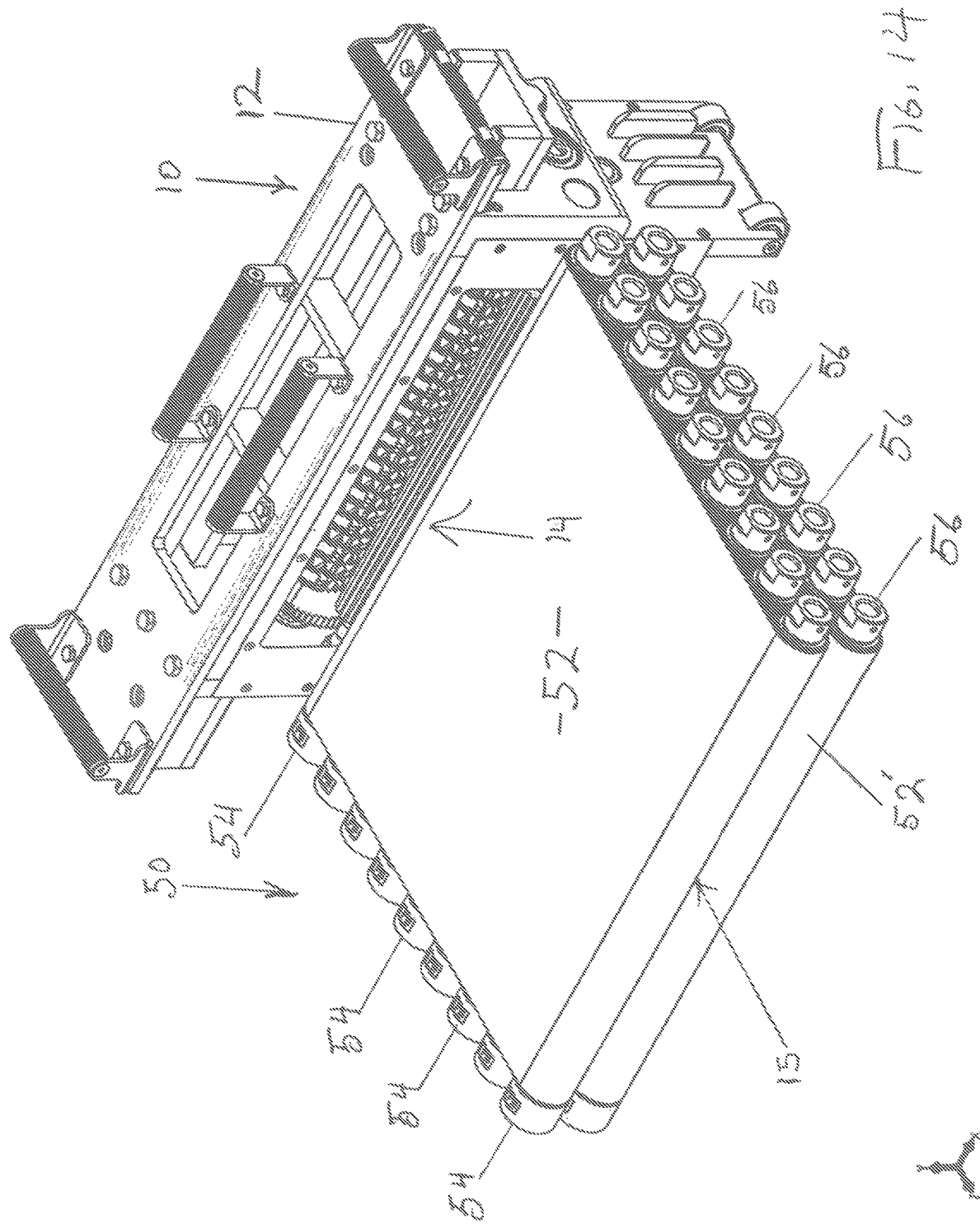
FIG. 14 is yet another preferred embodiment of the present invention, wherein the meat processing assembly is used in combination with a shaping assembly operatively disposed in communicating relation with the in-feed assembly thereof.
Figure 15:
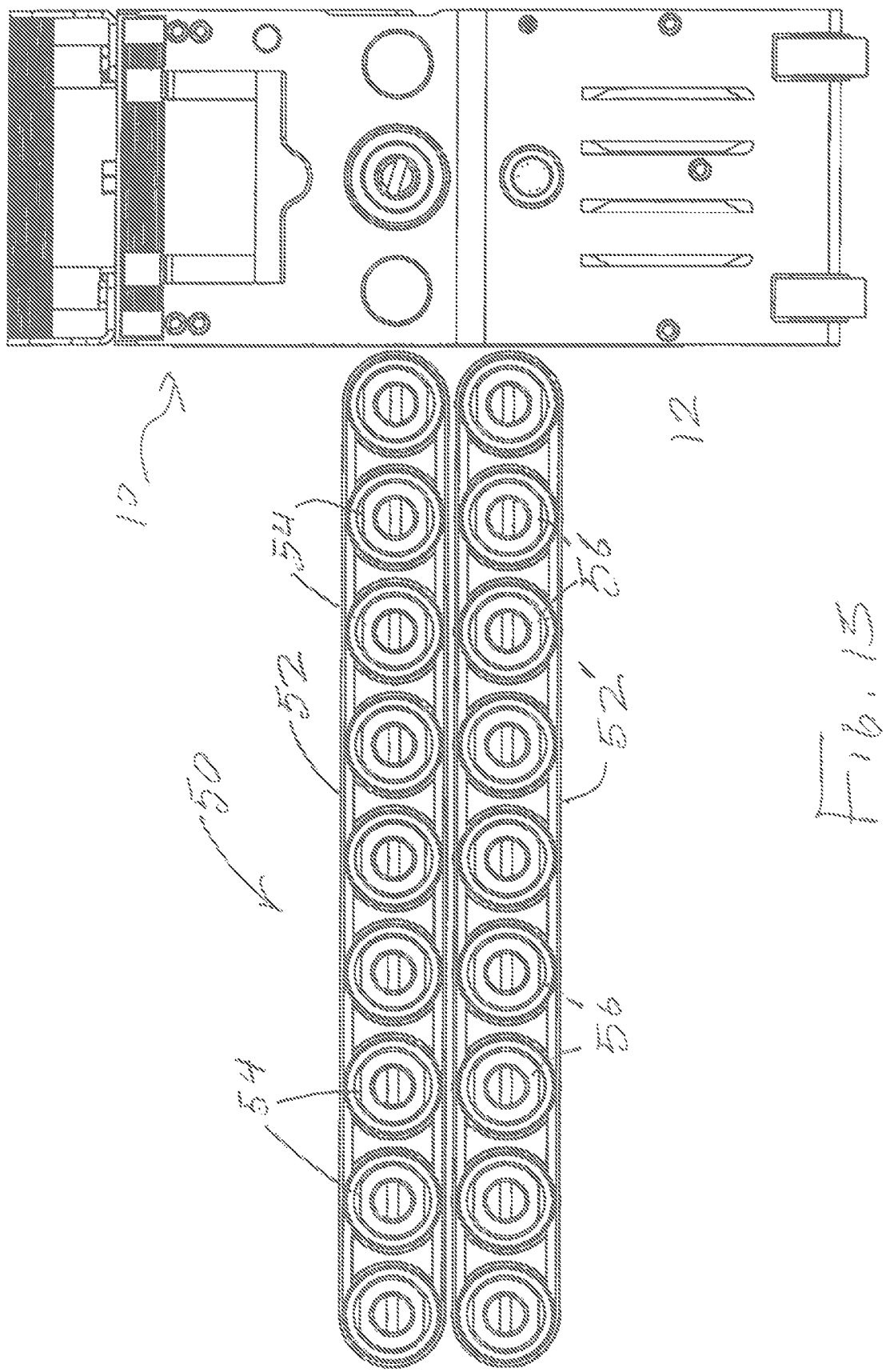
FIG. 15 is a side view of the shaping assembly of the embodiment of FIG. 14.
Figure 16:
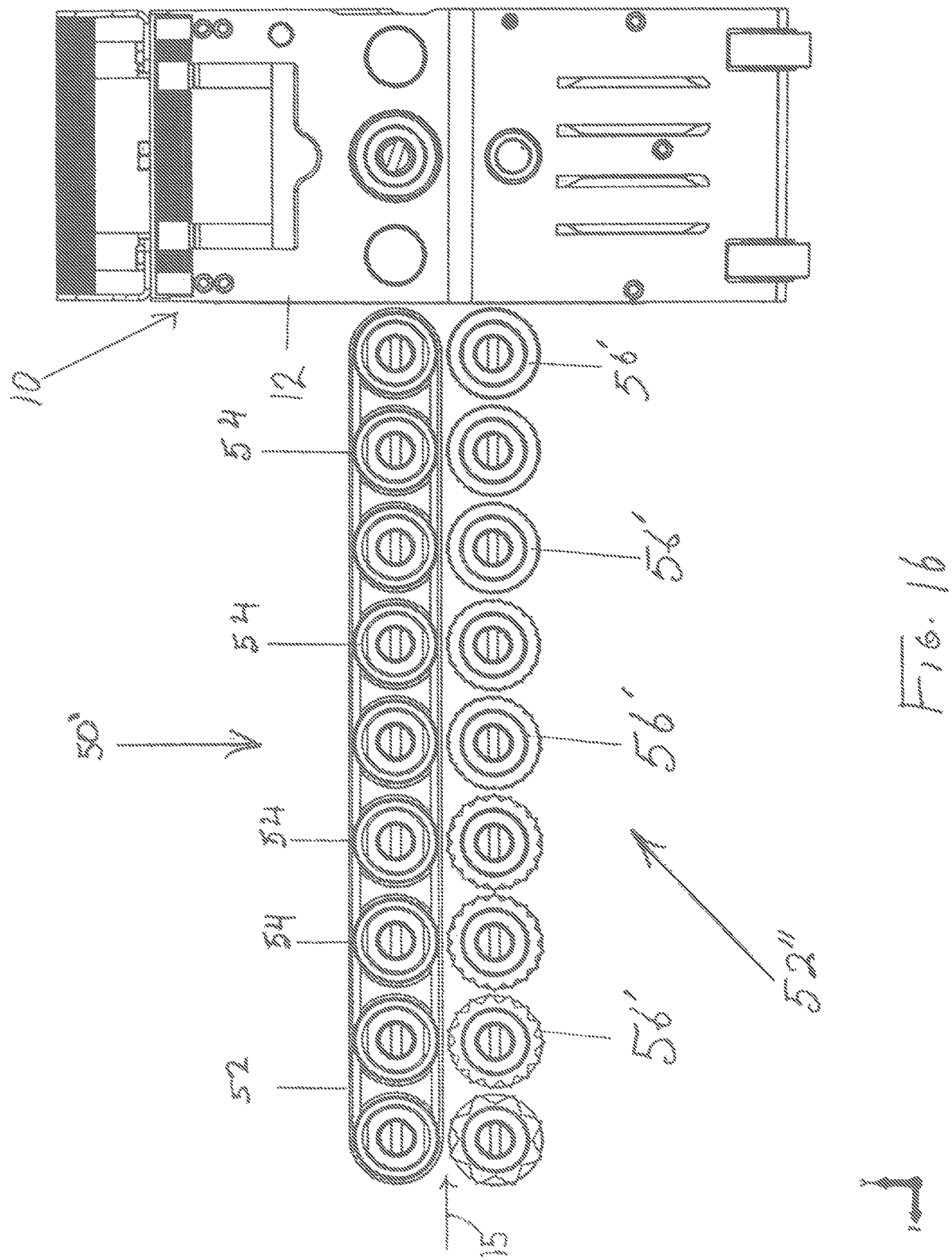
FIG. 16 is a side view of another preferred embodiment of the shaping assembly operatively similar to the embodiment of FIG. 14.
Figure 17:
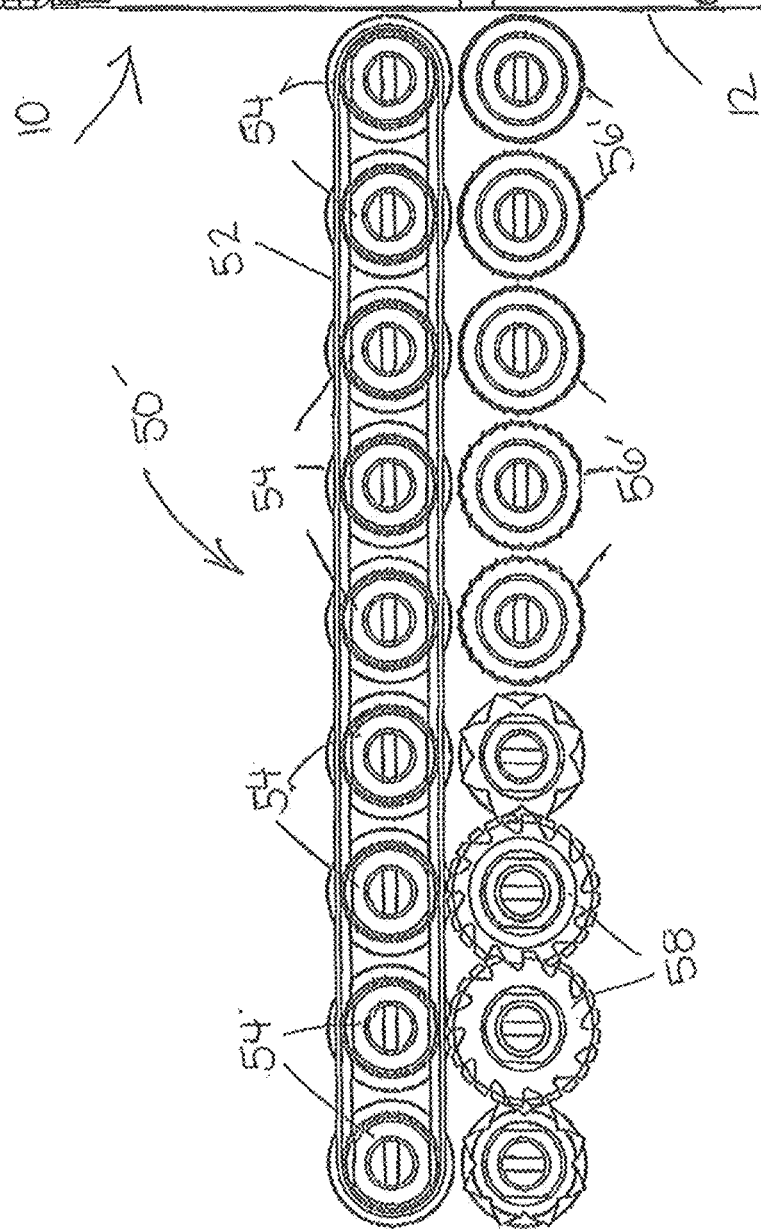
FIG. 17 is a side view of another preferred embodiment of the shaping assembly operatively similar but structurally distinguishable from the embodiments of FIGS. 14-16.
Figure 19:
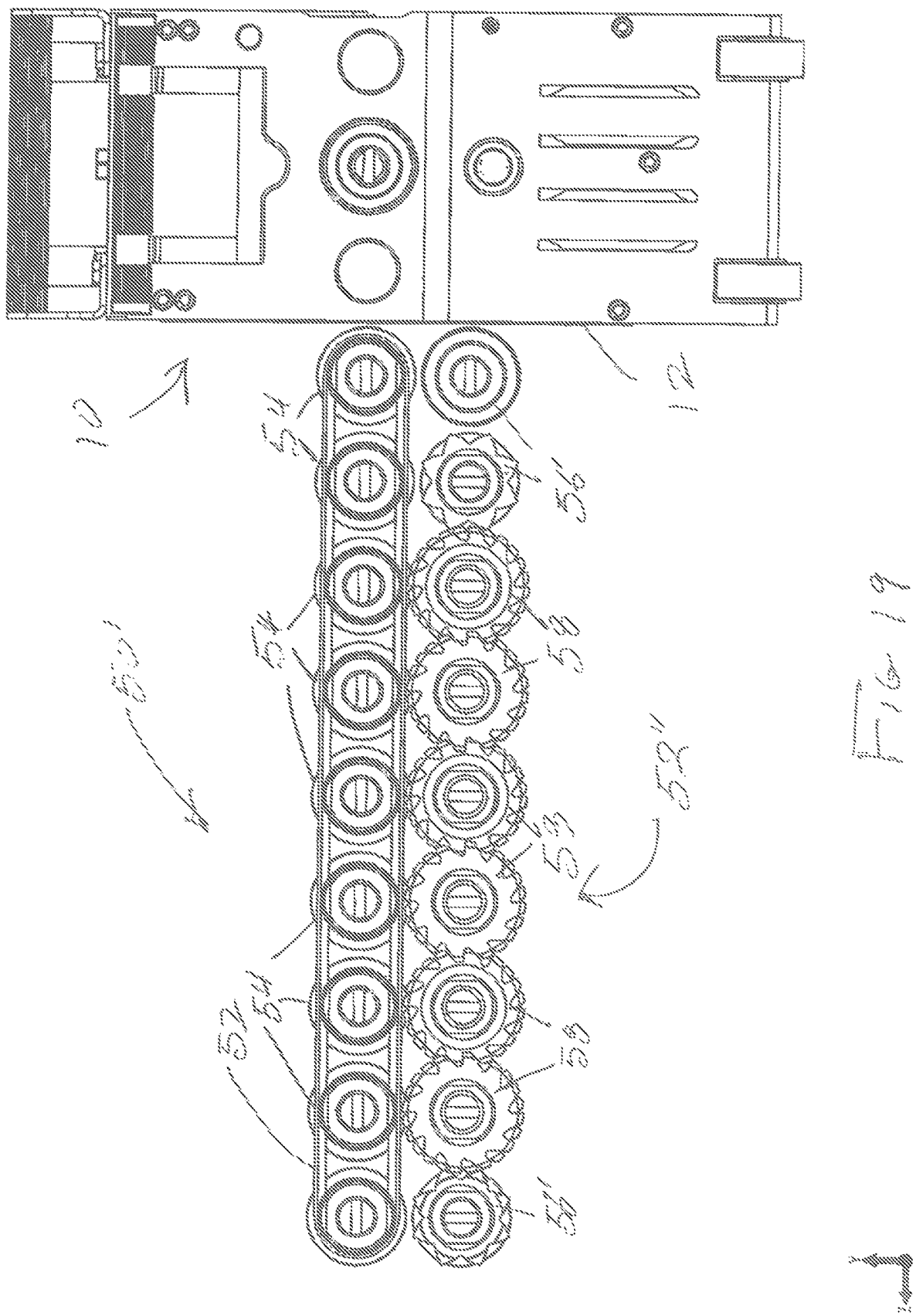
FIG. 19 is a side view of another preferred embodiment of the shaping assembly operatively similar to but structurally distinguishable from the embodiments of FIGS. 14-18.

As represented in FIGS. 14-21 the assembly 10 may also include or be used in combination with a shaping or forming assembly generally indicated as 50 in FIGS. 14 and 15 and as 50' in FIG. 16-21. The shaping assembly 50, 50' is disposed immediately adjacent to and in communication with the in-feed assembly 14 at the entrance of the modular support frame 12 and/or marking roller 26. Accordingly, in the embodiment of FIGS. 14 and 15, the shaping or sizing assembly includes two conveyor type belts 52 and 52', each being capable of continuous rotation or movement. As such, each of the conveyor belts 52 and 52' are supported and driven by a plurality of rollers 54 and 56 respectively. The rollers 54 and 56 rotate in opposite directions thereby facilitating the cooperative travel or movement of the respective conveyor belts 52 and 52', as well as the meat or food being processed along the path of travel 15. Another feature associated with the embodiments utilizing the conveyor belt 52 is the ability of the belt 52 to "smooth", flatten, etc. the corresponding surface of the meat or food product which is exposed to and which will be penetrated by the one or more marking members 38. The processing of the surface of the meat or food product, to be penetrated by the one or more marking members 38, to have a smooth or flattened surface facilitates the accurate formation/configuring of the mark or name formed thereon by the one or more marking members 38. Further, in at least the embodiment of FIGS. 20 and 21 the naming or marking roller 26 is represented as being used without the blade assembly 31, wherein the cutting of the meat or food into strips or segments, as set forth above, is not intended.

Somewhat similarly, in the embodiment of FIGS. 16-21, the upper portion of the shaping assembly 50' comprises the conveyor belt or similar conveyor structure 52 continuously driven by a plurality of drive rollers 54. However, the lower shaping or conveyor like structure 52" is absent a conveyor type roller 52 and comprises a plurality of successively disposed rollers 56' each rotational in a common direction. Accordingly, the exterior surface of each of the roller conveyor 52" may have a different and/or progressively changing outer surface configurations to facilitate the shaping, tenderizing, further processing and/or the driving of the meat or other food product, along the path of travel 15, between the upper conveyor type belt 52 and lower plurality of shaping, tenderizing and driving rollers 56'.

As also noted in FIGS. 16-20 various structural modifications of the rollers 56', specifically relating to the outer surface configuration thereof, may be included in the roller conveyor 52". Such structural modifications and may include an added or increased number of tenderizing rollers 58 which are at least partially structured to penetrate surface portions of the meat or food product passing along the path of travel 15.

Therefore, at least one purpose or function of the shaping and/or forming assembly 50 and 50' is to maintain and/or establish a certain thickness of the meat or other food product passing therebetween into the in-feed assembly 14. Such a thickness will be at least partially dependent upon and the corresponding dimension of the path of travel 15 so as to facilitate proper processing of the meat by the naming or marking roller 26, blade roller 32, support roller 42, etc. Further, as set forth above, the conveyor belt 52 and/or 52' will react with the corresponding exposed surface of the meat or food product to provide a relatively "smooth" surface. Such a smooth surface will facilitate the forming of a mark or name in the meat or food product when penetrated by the one or more marking members 38 associated with each of the one or more marking sections 28 of the marking roller 26.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An assembly for processing meat moving along a path of travel, said assembly comprising:
    at least one blade roller extending transverse to a length of the path of travel and including a plurality of spaced apart blades,
    said plurality of blades transversely connected to a length of said blade roller and rotatable therewith in substantially aligned relation to the length of the path of travel and in cutting relation to the meat, a marking roller disposed transverse to the length of the path of travel adjacent to said blade roller and including a plurality of marking sections connected to said marking roller and rotatable therewith relative to the length of the path of travel, said plurality of marking sections collectively oriented in transverse relation to the length of said marking roller, and a plurality of spaces each disposed between different adjacent ones of said plurality of marking sections, each of said plurality of blades disposed to pass through different ones of said plurality spaces between adjacent ones of said plurality of marking sections, concurrent to rotation of said blade roller and said marking roller, each of said plurality of marking sections including at least one marking member extending outwardly from a periphery of said marking roller into a penetrating orientation with the meat passing along the path of travel during rotation of the marking roller, a support assembly including at least one support roller disposed in supporting relation to the meat concurrently to disposition of said plurality of marking members into said penetrating orientation with the meat, a stripper structure including a plurality of fingers each having a free end, each of said free ends disposed within said plurality of spaces between adjacent ones of said plurality of marking sections, in removable relation to meat retained on said marking roller, and a plurality of slots extending between adjacent ones of said plurality of fingers, each of said plurality of slots structured to receive and allow passage therethrough of a different one of said plurality of marking sections, concurrent to rotation of said marking roller.

2. An assembly as recited in claim 1 wherein said at least one support roller is rotationally and transversely disposed along the length of the path of travel, said at least one support roller structured to rotate concurrently to rotation of said marking roller and disposition of said plurality of marking members in said penetration relation to the meat.

3. An assembly as recited in claim 1 wherein said stripper structure is fixedly disposed relative to the path of travel.

4. An assembly as recited in claim 1 wherein at least a majority of said marking sections include a plurality of marking members mounted thereon and rotatable therewith, said plurality of marking members extending outwardly from an outer periphery of said marking roller and sequentially disposed into a penetrating orientation with the meat passing along the path of travel, upon rotation of said marking roller; each of said majority of marking sections being relatively disposed to collectively produce a multi-character mark on the meat.

5. An assembly as recited in claim 1 wherein at least some of said plurality of blades are cooperatively disposed and dimensioned to produce cut meat segments each having a transverse dimension equal to at least a width dimensioned to substantially correspond to a width of a correspondingly disposed one of said plurality of marking sections.

6. An assembly as recited in claim 1 further comprising each of said plurality of spaces disposed and dimensioned to receive passage therethrough of a correspondingly disposed one of said plurality of blades, upon rotation of said blade roller.

7. An assembly as recited in claim 1 wherein at least some of said marking members are disposed and dimensioned to penetrate the meat to at least a predetermined minimum depth, prior to a first freezing thereof, when in said penetrating relation; said predetermined minimum depth sufficient to at least partially define a refrozen indicator of the meat.

8. An assembly as recited in claim 7 wherein said predetermined minimum depth is at least partially determined by a length of said respective marking member extending outwardly from said marking roller.

9. An assembly as recited in claim 7 wherein said refrozen indicator comprises a visually observable distortion of the configuration of the mark, relative to a configuration of a respective one of said marking members by which the mark was formed.

* * * * *